United States Patent
Yamamura et al.

[11] Patent Number: 6,028,838
[45] Date of Patent: Feb. 22, 2000

[54] NAVIGATION APPARATUS

[75] Inventors: Shinya Yamamura, Fukuoka; Kenichi Fukuda; Masaaki Wakamoto, both of Kawasaki, all of Japan

[73] Assignee: Fujitsu Limited, Kanagawa, Japan

[21] Appl. No.: 08/862,538

[22] Filed: May 23, 1997

[30] Foreign Application Priority Data

Oct. 28, 1996 [JP] Japan ................... 8-284786

[51] Int. Cl.[7] .............. H04J 1/16; H04L 1/00; G01R 31/08; G06F 11/00
[52] U.S. Cl. .............. 370/229; 370/230; 370/235
[58] Field of Search .................. 370/229, 230, 370/232, 233, 234, 235, 253, 252, 353, 902, 905, 356, 360, 395, 396, 400, 401, 402, 412, 413, 415, 420, 421, 437, 439; 707/1, 4, 102, 104

[56] References Cited

U.S. PATENT DOCUMENTS

| | | | |
|---|---|---|---|
| 5,600,643 | 2/1997 | Robrock, II | 370/399 |
| 5,649,107 | 7/1997 | Kim et al. | 370/232 |
| 5,671,225 | 9/1997 | Hooper et al. | 370/468 |
| 5,737,619 | 4/1998 | Judson | 707/500 |
| 5,812,526 | 9/1998 | Chang et al. | 370/230 |
| 5,832,508 | 11/1998 | Sherman et al. | 707/200 |

FOREIGN PATENT DOCUMENTS 7-334460 12/1995 Japan .
8-46617 2/1996 Japan .

*Primary Examiner*—Dang Ton
*Assistant Examiner*—Phirin Sam
*Attorney, Agent, or Firm*—Helfgott & Karas, PC.

[57] ABSTRACT

A navigation apparatus for displaying a service selection menu on a user terminal so as to navigate a user at the time of selection of a service provider. A traffic obtaining portion obtains band used by each circuit accommodating each service provider from a network controller, and a menu optimizing portion creates a service selection menu which reflects the band used by each circuit accommodating each service provider and displays the menu on a user terminal. When a user selects a predetermined service provider from the service selection menu, a service executing means judges whether or not the user terminal can be connected to the selected service provider, and if connectable, requests a path setting portion to set a path between the user terminal and the selected service provider. The path setting portion connects the user terminal to the selected service provider by an exchange.

11 Claims, 29 Drawing Sheets

FIG. 11A  TRAFFIC STORING BUFFER
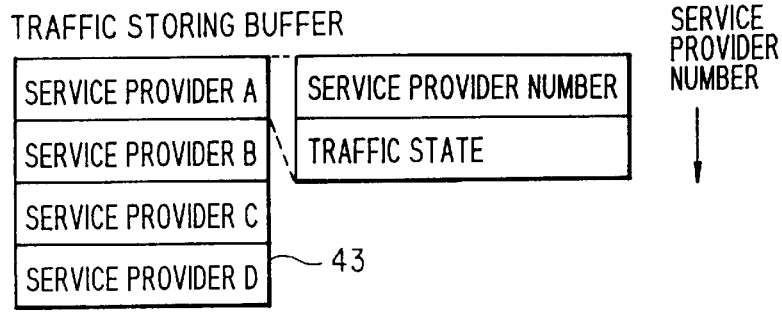
FIG. 11B  CONGESTION CONTROL DATA TABLE
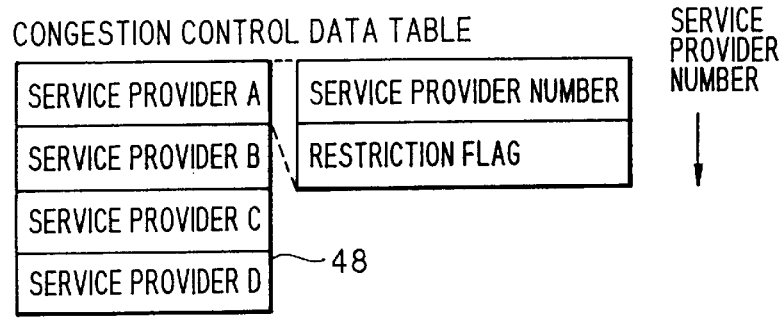
FIG. 11C  RESERVATION CONTROL TABLE
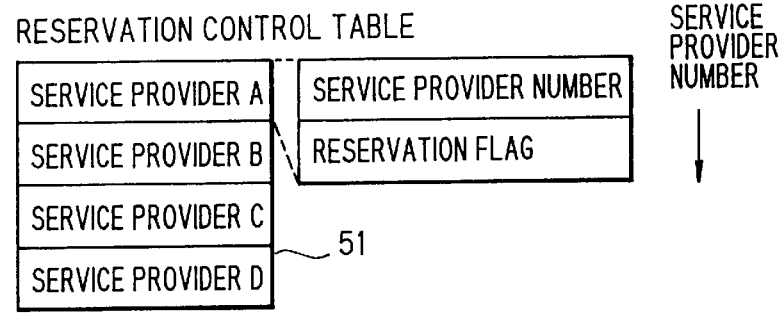
FIG. 11D  RESERVATION REGISTER BUFFER
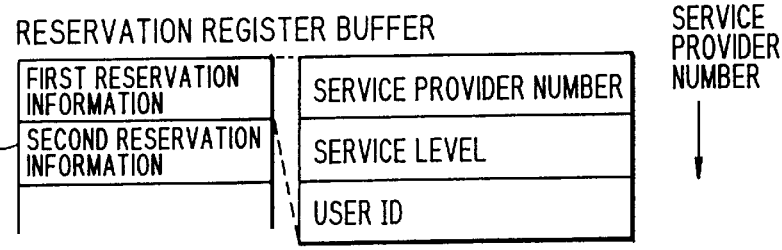
FIG. 11E  REASON TEXT TABLE
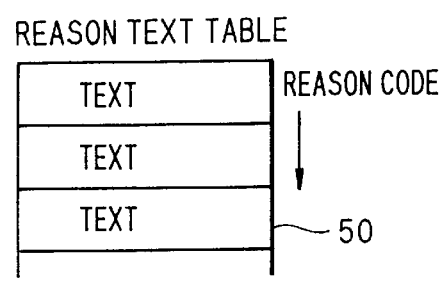

EXAMPLE OF DISPLAYED MENU

EXAMPLE OF DISPLAYED MENU

EXAMPLE OF DISPLAYED MENU

SELECT SERVICE PROVIDER B

EXAMPLE OF DISPLAYED MENU

NAVIGATION APPARATUS

BACKGROUND OF THE INVENTION

1. Field of the Invention

The present invention relates to a navigation apparatus for executing navigation at the time of selecting a service provider and, more particularly, to a navigation apparatus for displaying, on a user terminal, a service selection menu from which a user can select a service provider which provides multimedia service.

2. Description of the Related Art

There are network systems for connecting a user terminal to the service provider selected by the user from among a plurality of service providers which provide various kinds of multimedia service such as a video on demand (VOD) and on-line shopping, and providing the multimedia service from the selected service provider by utilizing a broadband-ISDN.

In such a network system, a navigation function is essential so that a user terminal can efficiently utilize the multimedia service provided by the service provider. A conventional navigation server, however, only serves to connect a user terminal to the service provider which provides the service designated by the user terminal.

For this reason, the user cannot judge whether or not the designated service is applicable to the user terminal until it is connected to the service provider. As a result, the connection is sometimes cut due to a shortage of network resource (e.g., shortage of band) or disagreement about how to decode a data stream. Even if a path is safely set between the user terminal and the service provider, it sometimes happens that since it is impossible to secure a sufficient transmission band, the service is not practically usable, or that the line is inconveniently held for a long time due to the transfer of an unexpectedly large amount of data. Another problem is that excessive access to a popular service provider makes it difficult to access smoothly.

Therefore, there is a strong demand for a network system which utilizes a broadband-ISDN and has a more useful service provider supporting function. If a network controller provided with a function of connecting a user terminal to a service provider and a function of controlling the traffic of the line is linked with a navigation server for executing navigation at the time of selecting a service provider, such a network system will be realized. In addition, in a broadband-ISDN in which the communication quality is different depending upon the network resource (band) allocated to the offer of service, simple navigation of a service provider is insufficient. There is, therefore, a demand for a more valuable function of navigating a user terminal to a service provider in due consideration of the type of user terminal and service provider, and the network resource (band) necessary for the allocation of the offer of the service.

SUMMARY OF THE INVENTION

Accordingly, it is a first object of the present invention to eliminate the above-described problems in the related art and to provide a high-degree service selection menu to a user by linking a network controller for executing connection control of a network and traffic control with a navigation server.

It is a second object of the present invention to provide a user with a service selection menu which dynamically reflects the traffic (heavy, middle, light) of a circuit so as to make the user avoid selecting a service provider which is so much congested that the degeneration of the service quality is apprehended, thereby dispersing traffic.

It is a third object of the present invention to secure service quality of a service provider by restricting access to the service provider when traffic congestion is continual in a circuit accommodating the service provider.

It is a fourth object of the present invention to enable a user to bypass a service provider when circuit accommodating the service provider is congested, to another service provider having the same function and enough capacity.

It is a fifth object of the present invention to provide a service selection menu which excludes a service provider that cannot be connected to a user terminal because a user has not made a receiving contract or the user has rejected the connection by his/her own will, or due to the performance of the user terminal, thereby enabling the user to efficiently select a accessible service provider.

It is a sixth object of the present invention to display the reason why a service provider cannot be connected when such a service provider is selected.

It is a seventh object of the present invention to display information as to a service provider designated by a user which is helpful to the user at the time of selecting the service provider.

It is an eighth object of the present invention to provide a user with a service selection menu which reflects the result of the judgment as to whether or not each of the service providers can be connected to a user terminal at each of a plurality of quality levels of service so as to enable the user to receive the service at a predetermined quality.

It is a ninth object of the present invention to enable a user to reserve a service provider which cannot be connected due to a shortage of available band of a circuit accommodating the service provider, and to connect the user terminal to the reserved service provider when the problem is solved so that the user can receive the service.

It is a tenth object of the present invention to classify the service provided by a service provider into a plurality of quality levels, to enable a user to reserve a service provider at a predetermined quality level which cannot be connected due to a shortage of available band of a circuit accommodating the service provider, and to connect the user terminal to the reserved service provider when the problem is solved so that the user can receive the service at the reserved quality level.

The first and second objects of the present invention are achieved by a navigation apparatus comprising: (1) a traffic obtaining means for obtaining the traffic of a circuit which accommodates a service provider from a network controller; (2) a menu optimizing means for creating a service selection menu which reflects the traffic (heavy, middle, light) of the circuit of each service provider obtained and displaying the service selection menu on a user terminal; and (3) a service executing means for monitoring the operation of a user with respect to the service selection menu and requesting a path setting means to set a path between the user terminal and a service provider when the service provider is selected.

The first and third objects of the present invention are achieved by a navigation apparatus comprising: (1) a traffic obtaining means for obtaining the band used by the circuit which accommodates a service provider from a network controller; (2) a traffic storing buffer for storing the band obtained by the traffic obtaining means; (3) a service provider data base for storing the information as to a service provider; (4) a menu buffer for storing data which shows whether or not the service is restricted with respect to a service provider on the basis of the traffic of the circuit which accommodates the service provider; (5) a menu optimizing means for comparing the band used by the circuit of each service provider which is stored in the traffic storing buffer with the restriction band of each service provider which is registered in advance in the service provider data base, storing 'restricted service' into the menu buffer in correspondence with a service provider when the band used by the circuit of the service provider is larger than the restriction band, and creating the service selection menu so as to enable discrimination between whether or not the service is restricted with respect to each service provider; and (6) a service executing means for referring to the menu buffer when a user terminal selects a predetermined service provider, and annulling the selection if the service of the service provider is restricted, while requesting a path setting means to set a path between the user terminal and the selected service provider if the service thereof is not restricted.

The fourth object of the present invention is achieved by a navigation apparatus comprising: (1) a menu optimizing means for comparing the band used by the circuit of each service provider which is stored in the traffic storing buffer with the restriction band of each service provider which is registered in advance in the service provider data base, judging whether or not the 'bypass' of a service provider is registered in the service provider data base when the band used by the circuit of the service provider is larger than the restriction band, and storing the 'bypass' in correspondence with the service provider in the menu buffer if the answer is in the affirmative; and (2) a service executing means for referring to the menu buffer when a user terminal selects a predetermined service provider, obtaining a substitute service provider to which the selected service provider is bypassed and which is registered in advance in the service provider data base in correspondence with the selected service provider, if "bypass" is stored in the menu buffer in correspondence with the selected service provider, and requesting a path setting means to set a path between the user terminal and the substitute service provider.

The fifth object of the present invention is achieved by a navigation apparatus comprising: (1) a traffic obtaining means for obtaining the band used by the circuit which accommodate a service provider; (2) a traffic storing buffer for storing the band obtained by the traffic obtaining means; (3) a user information data base for storing the access information showing whether or not a user terminal is accessible to each service provider; (4) a menu buffer; (5) a menu optimizing means for obtaining each service provider to which a user terminal is accessible with reference to the access information stored in the user information data base when the user terminal is connected to the navigation server, obtaining the available band of the circuit of each service provider to which the user terminal is accessible with reference to the band used by the circuit accommodating each service provider which is stored in the traffic storing buffer, judging whether or not the user terminal can be connected to each accessible service provider in consideration of the available band and the band which is necessary for providing service, storing whether or not the user terminal can be connected to a service provider in the menu buffer with respect to each accessible service provider, creating a service selection menu which reflects the possibility of connection for each service provider and displaying the service selection menu on the user terminal; and (6) a service executing means for judging a user terminal can be connected to a service provider with reference to the menu buffer when the user terminal selects a predetermined service provider, and requesting a path setting means to set a path between the user terminal and the selected service provider if the answer is in the affirmative.

The fifth object of the present invention is also achieved by a navigation apparatus comprising: a user information data base for storing the performance such as a decoding system of a user terminal, a service provider data base for storing the performance such as an encoding system of a service provider, and a menu optimizing means for comparing the performance of the user terminal with the performance of the service provider so as to judge whether or not the user terminal is accessible to the service provider, creating a service selection menu which reflects the result of the judgement and displaying the service selection menu on the user terminal.

The sixth object of the present invention is achieved by a navigation apparatus comprising: (1) a reason text table for storing a reason code corresponding to the reason for the impossibility of selection of a service provider and the message conveying the reason in correspondence with each other, (2) a menu optimizing means for storing the reason code which corresponds to the reason for the impossibility in a menu buffer in correspondence with a user terminal when the user terminal cannot be connected to a service provider, creating a service selection menu which enables a user terminal to discriminate the possibility of selection of a service provider, and displaying the service selection menu on the user terminal, and (3) a service executing means for displaying said reason for the impossibility of selection on a user terminal with reference to said reason code stored in said menu buffer when a service provider to which said user terminal cannot be connected is selected by said user terminal.

The seventh object of the present invention is achieved by a providing a navigation apparatus with a service provider data base for storing the information as to a service provider and displaying the information on a user terminal when the user terminal selects the service provider.

The eighth object of the present invention is achieved by a navigation apparatus comprising: (1) a menu optimizing means for judging whether or not each accessible service provider can be connected to a user terminal at each quality level in consideration of the available band of a circuit accommodating each accessible service provider and the band necessary for providing the service at each quality level, storing the result of the judgement in a menu buffer, creating a service selection menu which reflects the result of the judgement and displaying the service selection menu on a user terminal, and (2) a service executing means for judging whether or not the service can be provided at a desired quality level with reference to the menu buffer when a user terminal selects a service provider and the quality level, and requesting a path setting means to set a path between the user terminal and the selected service provider if the answer is in the affirmative.

The ninth object of the present invention is achieved by a navigation apparatus comprising: (1) a traffic obtaining means for obtaining the band used by the circuit which accommodates a service provider from a network controller; (2) a menu optimizing means for judging whether or not a service provider can be connected with reference to the band used by the circuit accommodating the service provider, creating a service selection menu which enables a user terminal to discriminate the impossibility of connection of a service provider and to reserve the service provider which cannot be connected, and displaying the service selection menu on the user terminal; (3) a service executing means for monitoring the operation of the user with respect to the service selection menu and executing the control corresponding to the operation; (4) a reservation control table for storing the information which specifies the service provider reserved by the user terminal; (5) a reservation register buffer for storing the information of the user terminal which has reserved the service provider and the reserved service provider in correspondence with each other; (6) a reservation registering means for setting each information in the reservation control table and the reservation register buffer respectively; and (7) a reservation executing means for executing a path setting control between the user terminal which has reserved the service provider and the reserved service provider.

The tenth object of the present invention is achieved by a navigation apparatus comprising: a menu optimizing means for judging whether or not a service provider can be connected to a user terminal at each quality level in consideration of the available band of a circuit accommodating each service provider and the band necessary for providing a service at each quality level, creating a service selection menu which enables a user terminal to discriminate a quality level and a service provider when the service provider cannot be connected at the predetermined quality level due to a shortage of available band and to reserve the quality level and the service provider, and displaying the service selection menu on the user terminal.

Other features and advantages of the present invention will be apparent from the following description taken in conjunction with the accompanying drawings.

BRIEF DESCRIPTION OF THE DRAWINGS

FIGS. 11A to 11E are explanatory views of the structure of second data;

Figure 21A:
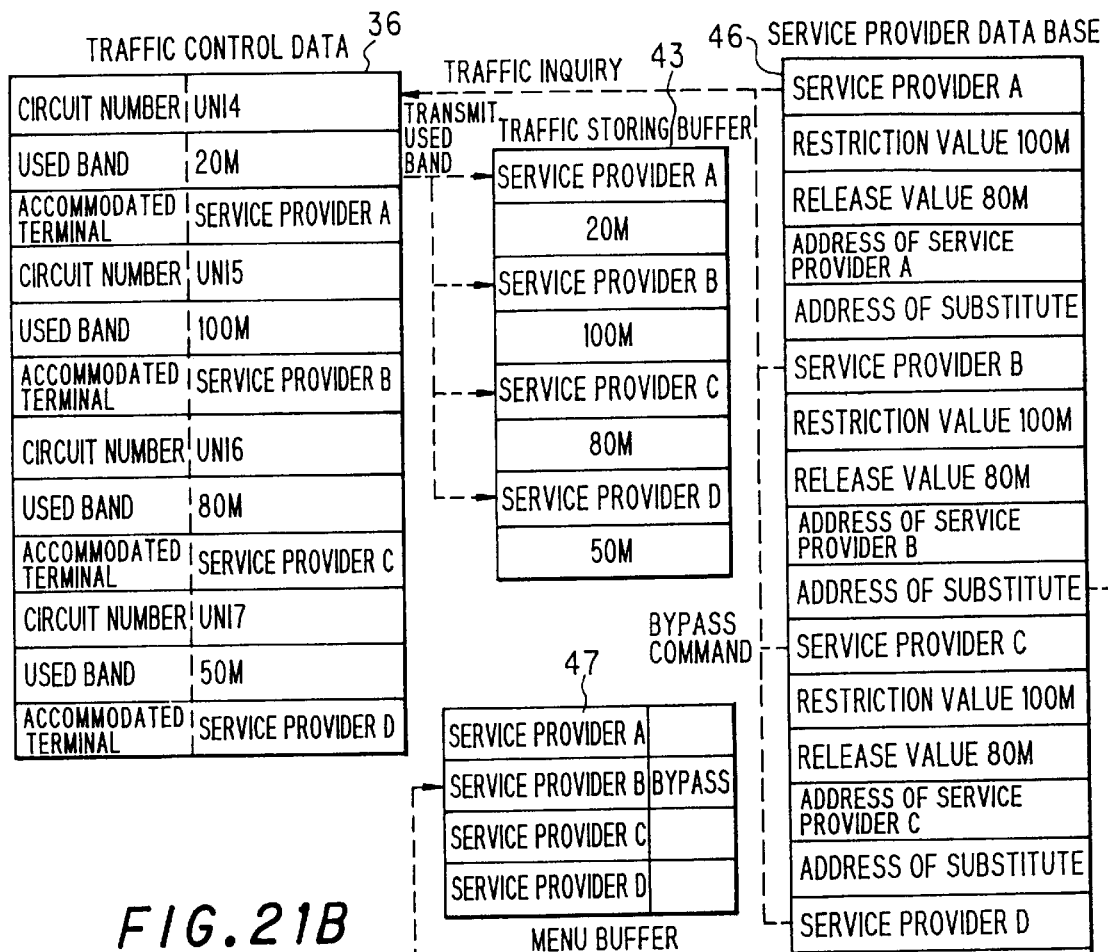
Figure 21B:
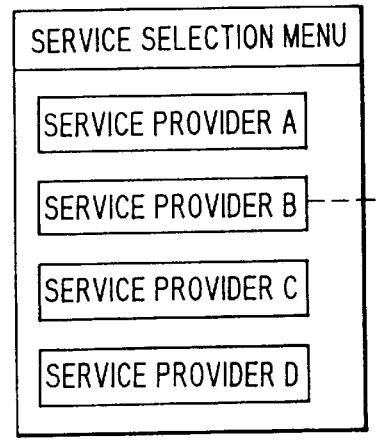
Figure 22A:
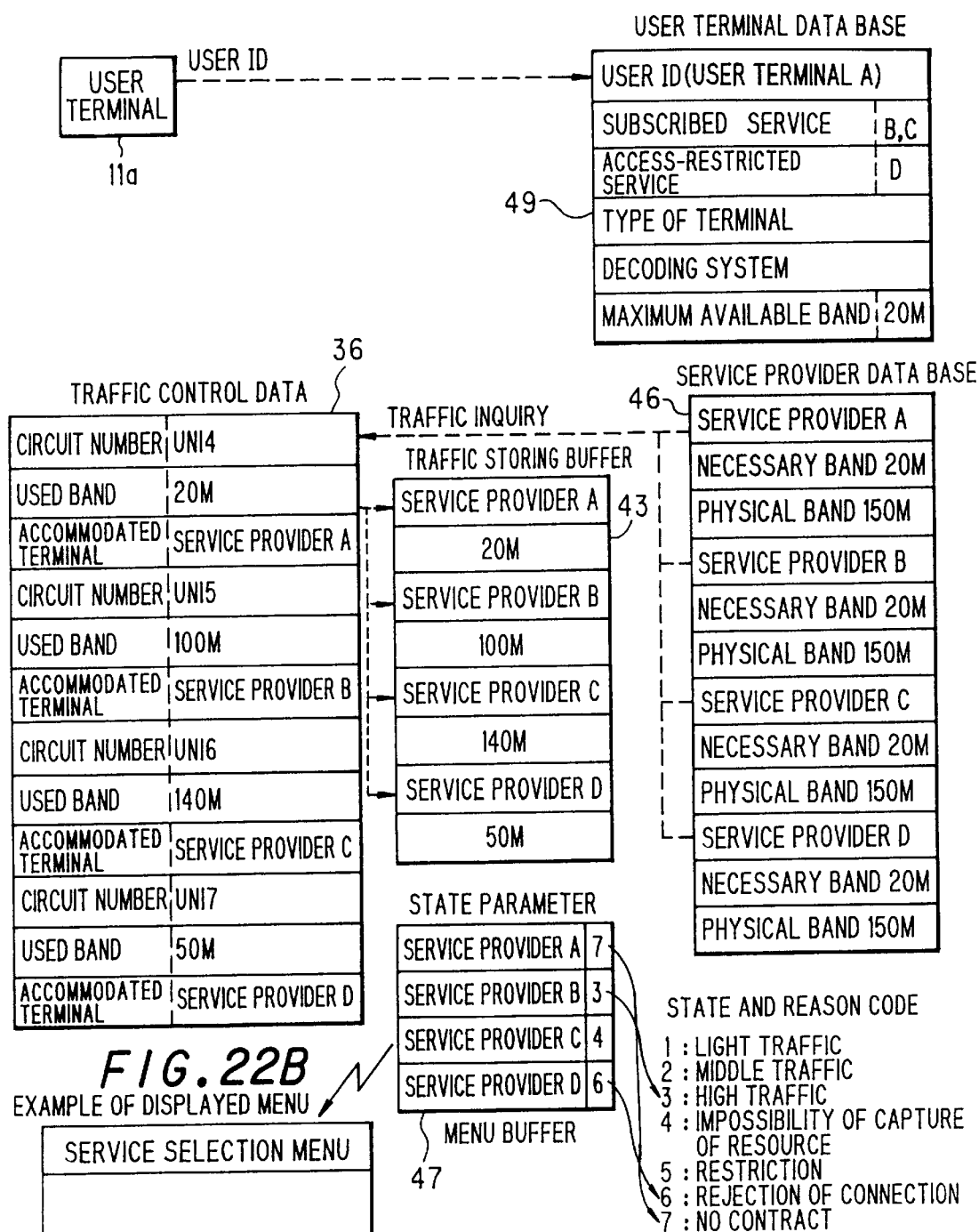
Figure 22B:
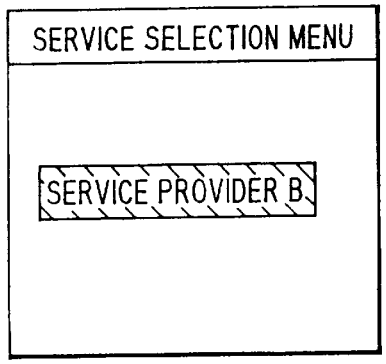
Figure 23:
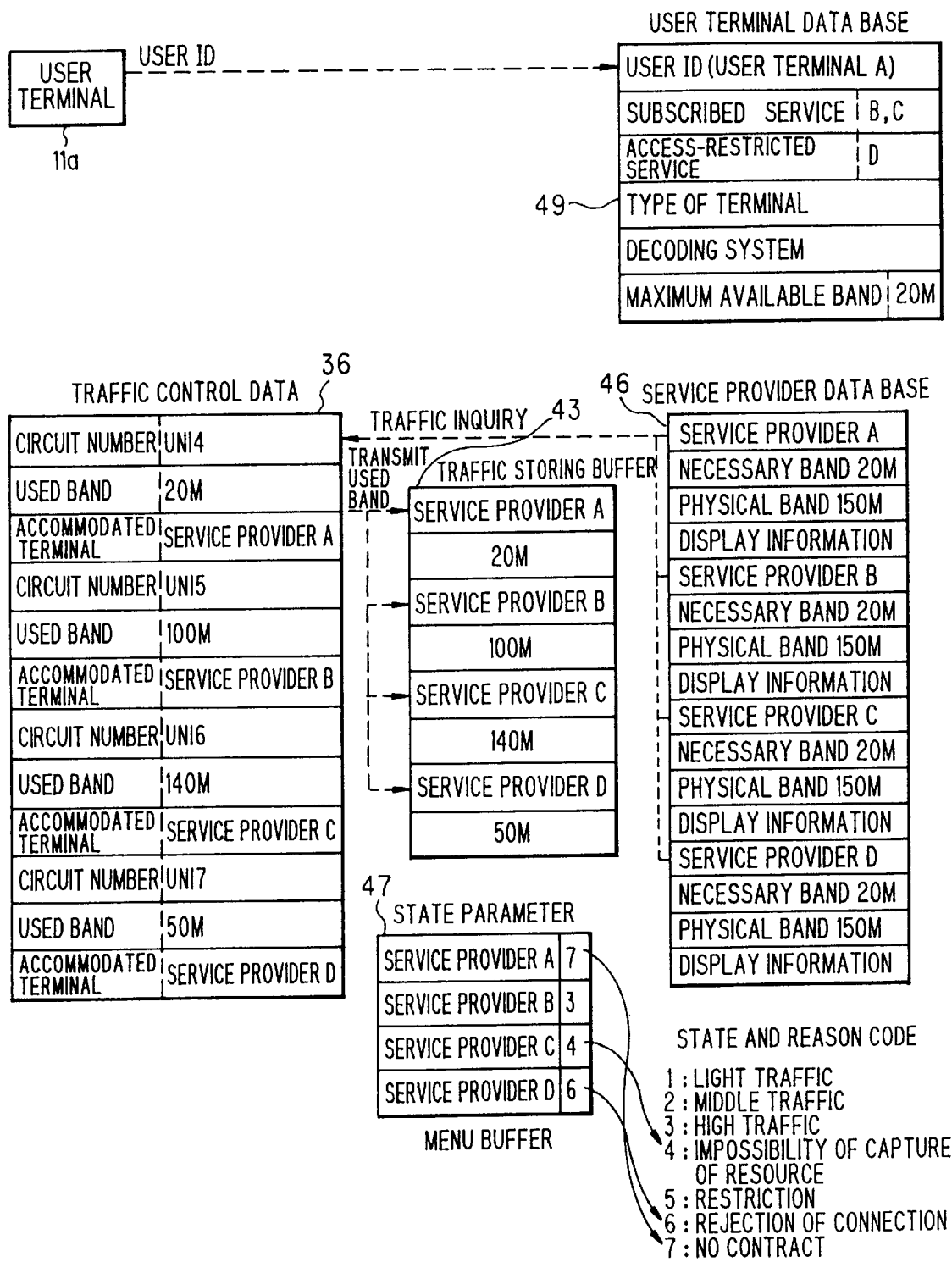
Figure 24:
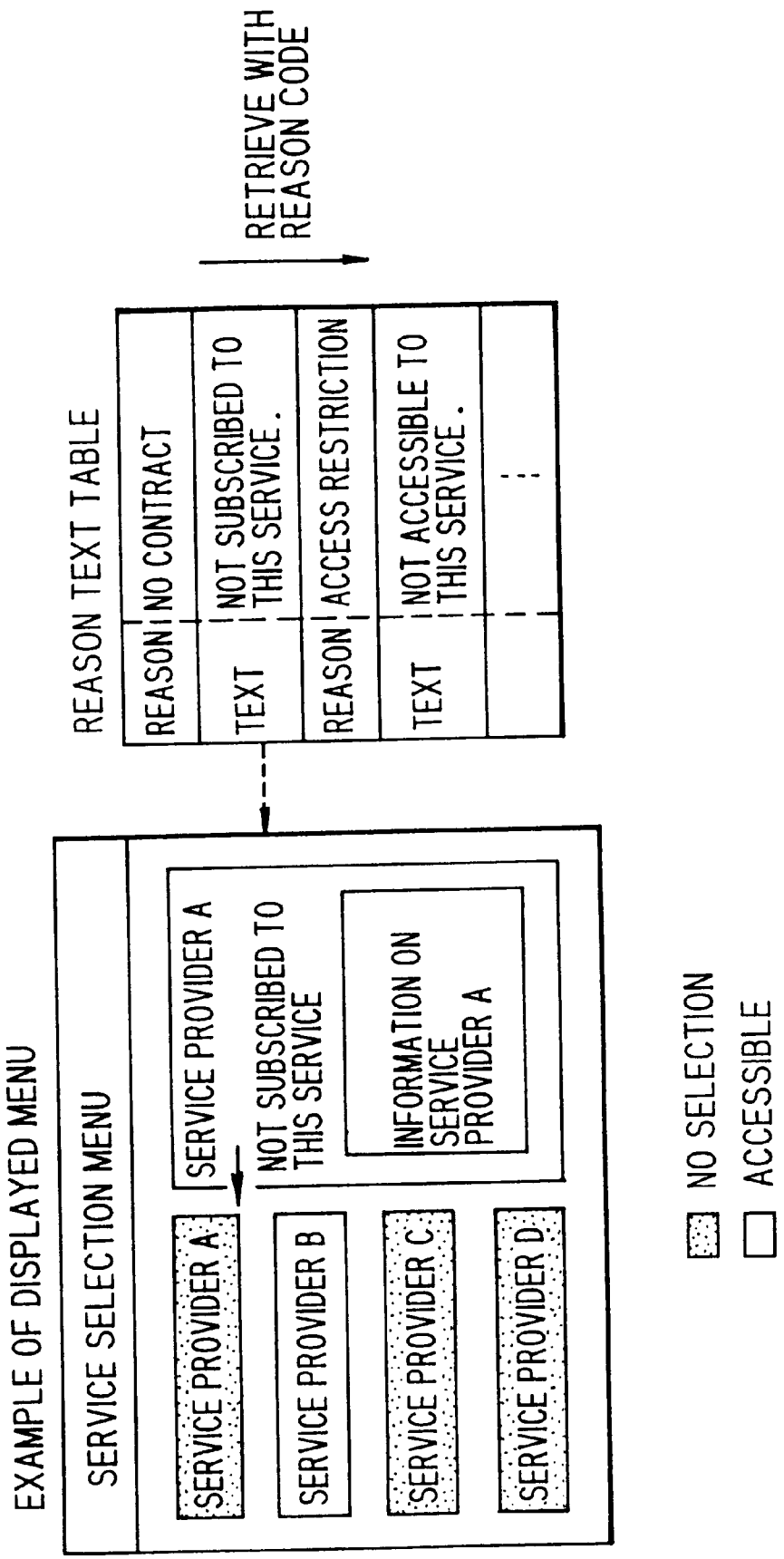
Figures 25A, 25B:
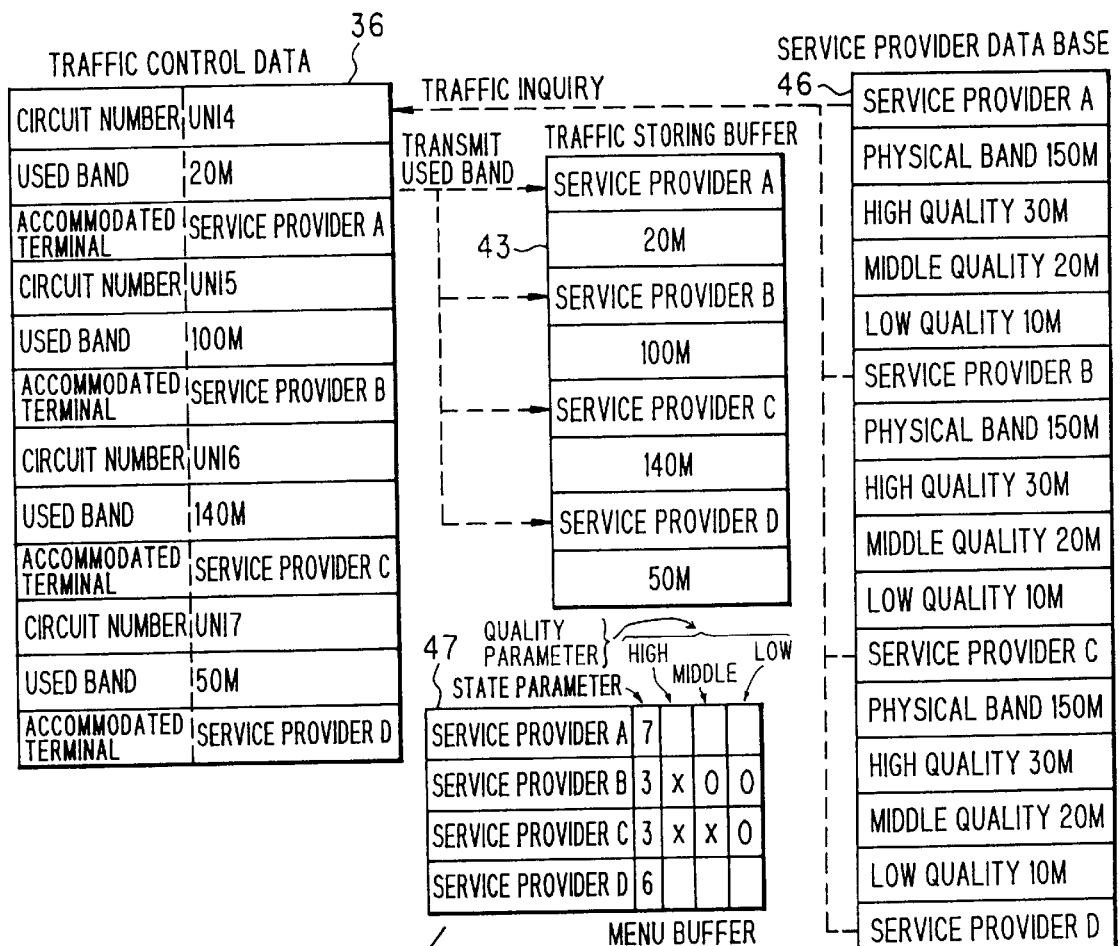
Figure 26:
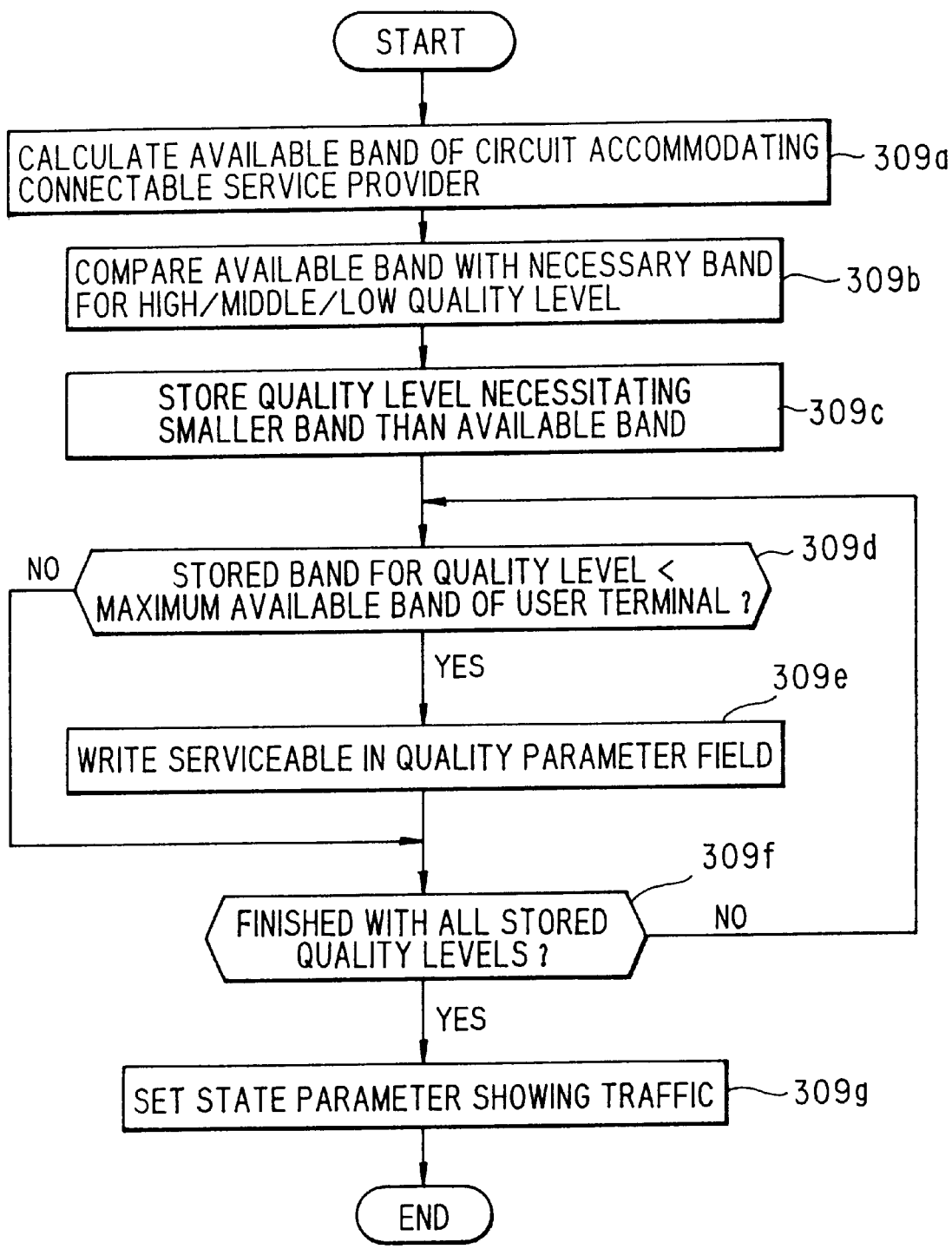
Figure 27:
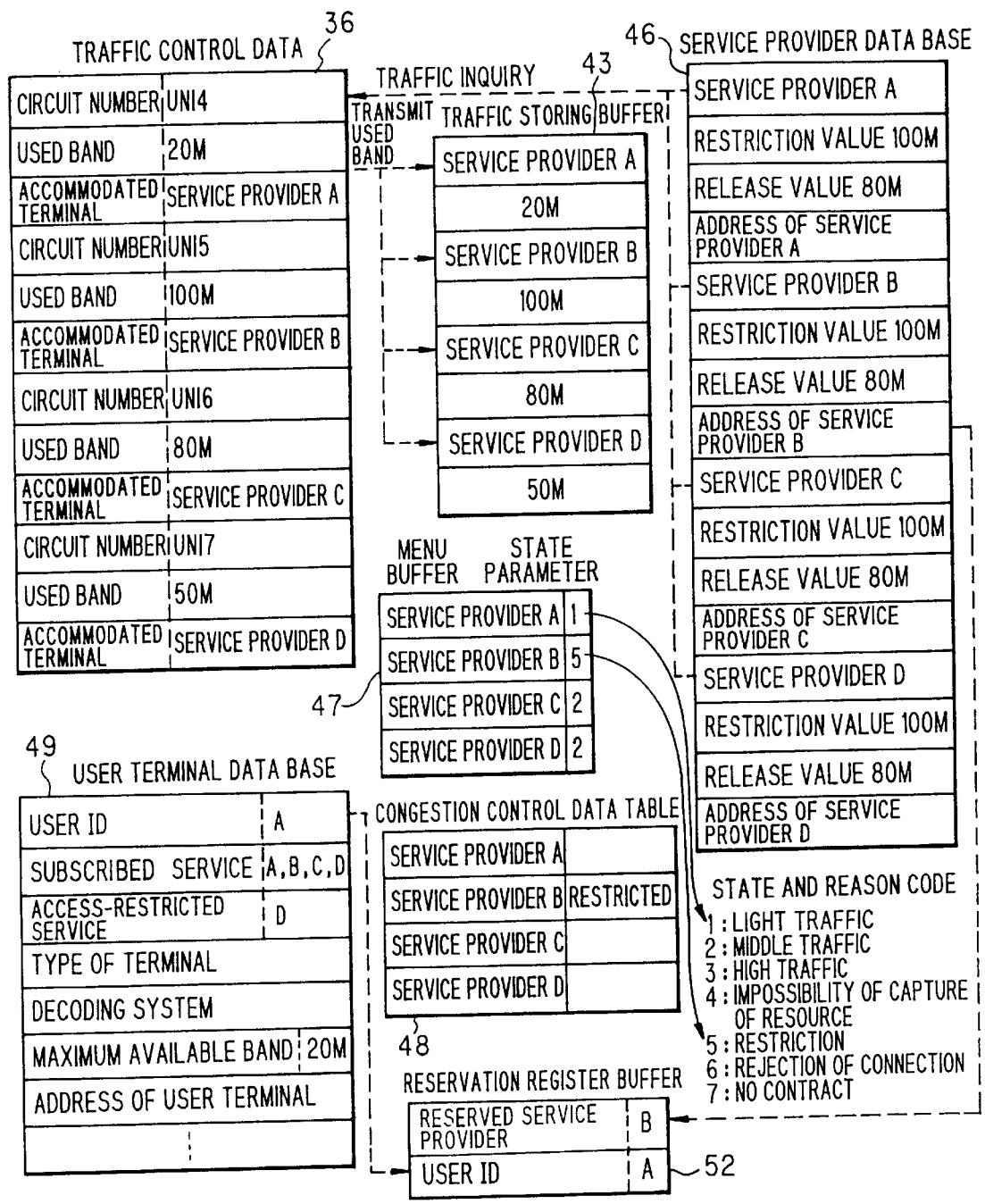
Figure 28:
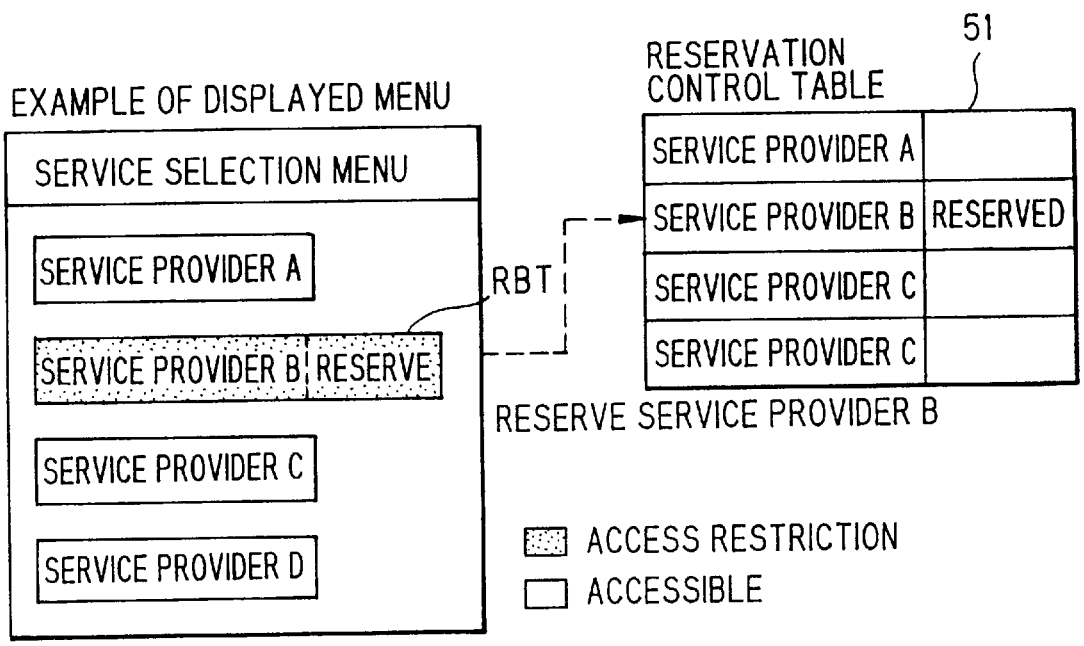
Figure 29:
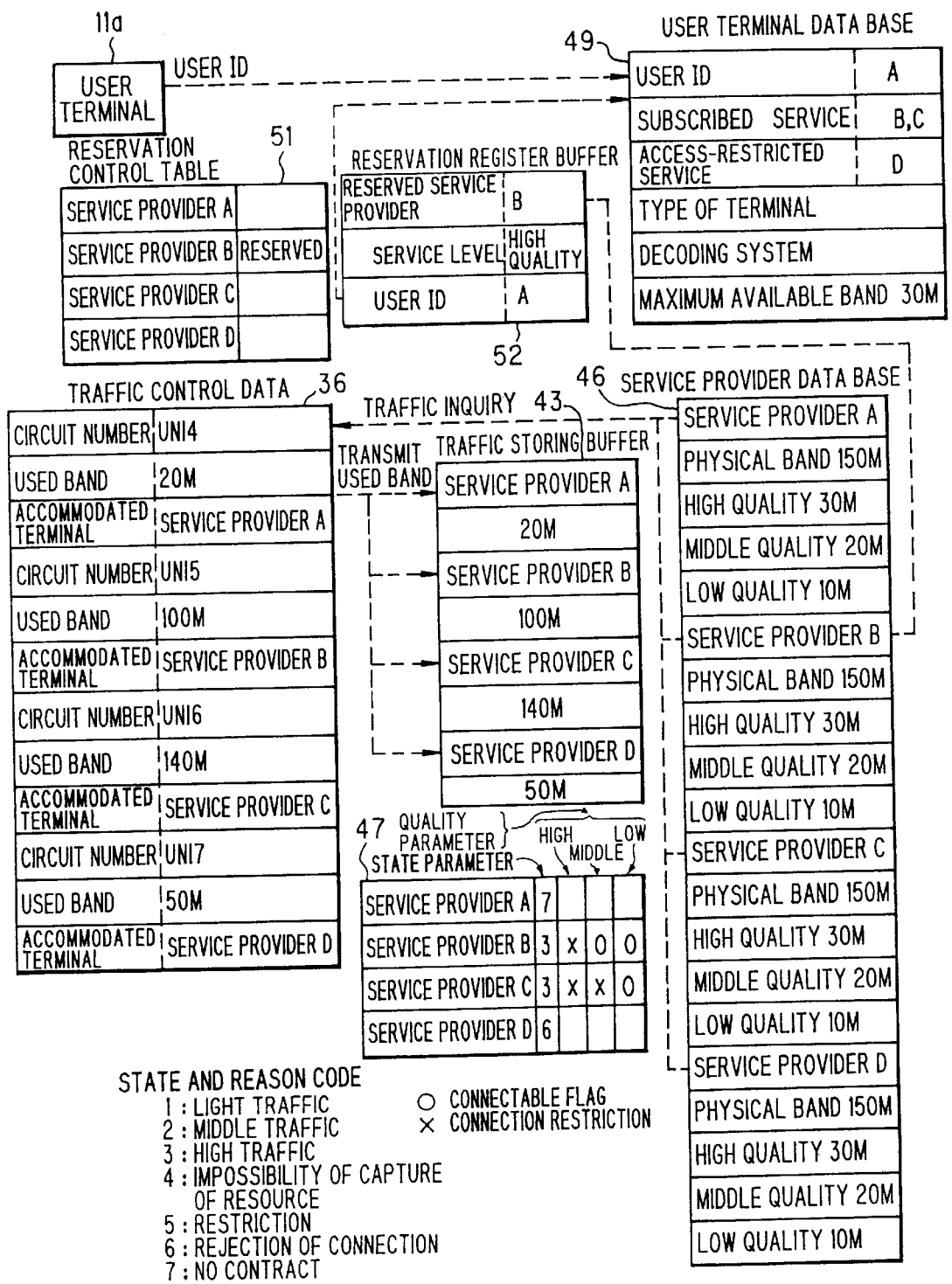
Figure 30:
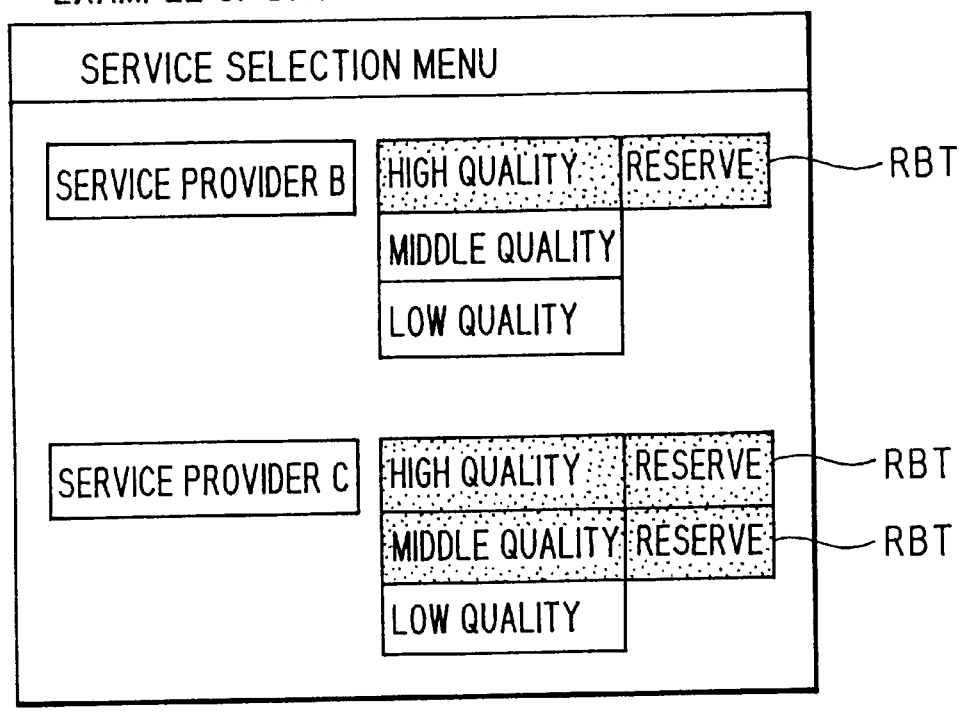

and an example of a service selection menu displayed after the process;

FIG. 21A shows examples of various data for explaining the bypass process executed when a service provider is congested;

FIG. 21B shows an example of a service selection menu displayed after the process explained in FIG. 21A;

FIG. 22A shows examples of various data for explaining the process for creating an optimum menu;

FIG. 22B shows an example of a service selection menu displayed after the process shown in FIG. 22A;

FIG. 23 shows examples of various data set for explaining the process for displaying the information on a service provider and the reason for the impossibility of connection;

FIG. 24 shows an example of a displayed service selection menu and explains a reason text table;

FIG. 25A shows examples of various data for explaining the process for displaying a menu which reflects the service quality level;

FIG. 25B shows an example of a service selection menu displayed after the process explained in FIG. 25A;

FIG. 26 is a flowchart of a quality parameter setting process;

FIG. 27 shows examples of various data set for explaining the reservation process for a service provider which is congested;

FIG. 28 is an explanatory view of a service selection menu which enables reservation and a reservation control data table;

FIG. 29 shows examples of various data set for explaining the reservation process which corresponds to a service quality level; and FIG. 30 is an explanatory view of a service selection menu which enables reservation for each quality level.

Figure 1:
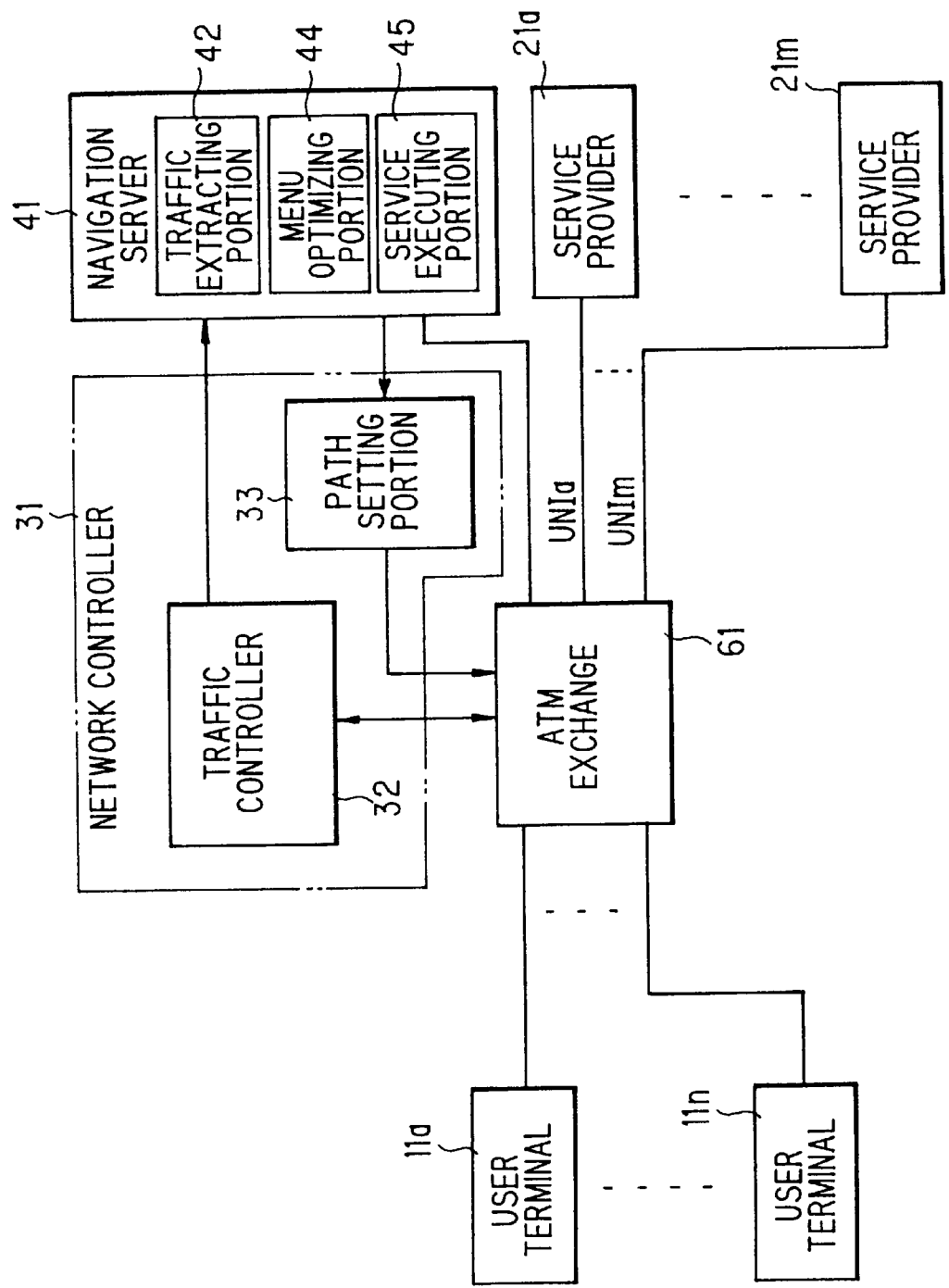
FIG. 1 schematically explains the entire structure of a service providing system according to the present invention.

DESCRIPTION OF THE PREFERRED EMBODIMENTS (A) Schematic Explanation of Present Invention (a) Schematic structure of service providing system FIG. 1 schematically explains the entire structure of a service providing system according to the present invention. In FIG. 1, the reference numerals 11a to 11n represent user terminals which receive service, 21a to 21m service providers for providing multimedia service, 31 a network controller, 41 a navigation server which displays a service selection menu on a user terminal so as to navigate the user terminal to a service provider and requests a path setting portion to set a path between the user terminal and the service provider selected by the user terminal, and 61 an ATM (Asynchronous Transfer Mode) exchange which accommodates a plurality of service providers, a plurality of user terminals, and the navigation server so as to connect a path between a user terminal and the navigation server when the user terminal requests connection, and connects a path between the user terminal and a service provider.

In the network controller 31, the reference numeral 32 denotes a traffic controller for controlling the traffic of (band used by) each of the circuits UNIa to UNIm, and 33 the path setting portion for causing the ATM exchange to connect a path between a predetermined user terminal and a service provider at the request of the navigation server 41.

In the navigation server 41, the reference numeral 42 represents a traffic obtaining portion for obtaining the traffic of the circuits UNIa to UNIm accommodating the service providers 21a to 21m, 44 a menu optimizing portion for creating a service selection menu which reflects the traffic of the circuits UNIa to UNIm accommodating the service providers 21a to 21m, and displaying the service selection menu on a user terminal, and 45 a service executing portion for monitoring the operation of a user with respect to the service selection menu and executing the service corresponding to the operation.

(b) Schematic explanation of first embodiment

Figure 2:
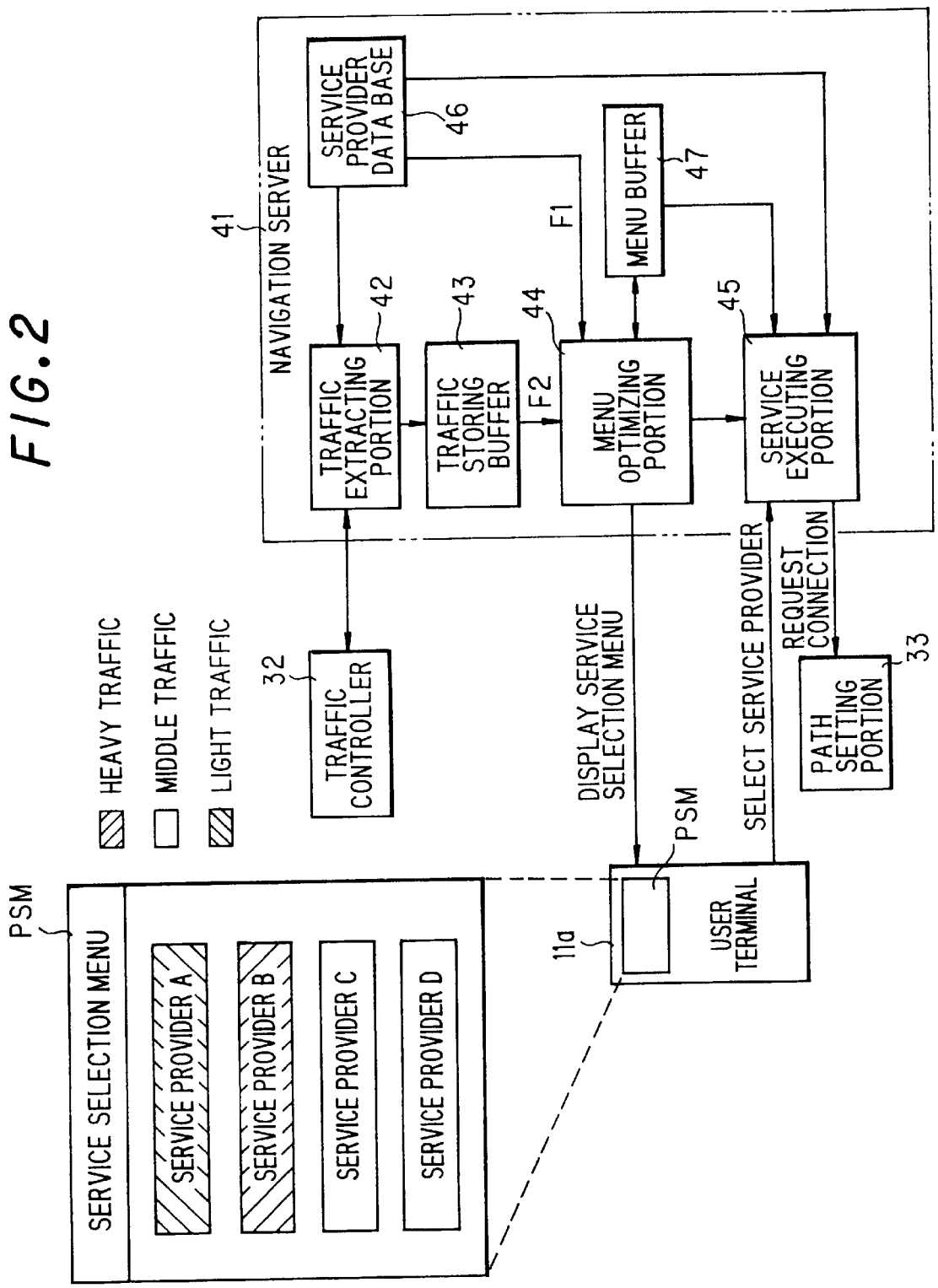
FIG. 2 is a schematic explanatory view of a first embodiment of the present invention.

FIG. 2 is a schematic explanatory view of a first embodiment of the present invention. In FIG. 2, the reference numeral 11a represents a user terminal, 32 a traffic controller, 33 a path setting portion, and 41 a navigation server. Communication is executed between the user terminal 11a and the navigation server 41 via an ATM exchange (not shown).

In the navigation server 41, the reference numeral 42 represents a traffic obtaining portion, 43 a traffic storing buffer, 44 a menu optimizing portion, 45 a service executing portion, 46 a service provider data base, and 47 a menu buffer.

The traffic obtaining portion 42 recognizes all the service providers which are registered in the service provider data base 46, and inquires of the traffic controller 32 about the traffic of the circuit accommodating a service provider. The traffic controller 32 dynamically records the traffic of (band used by) each circuit accommodating a service provider, and reports the band used by the circuit accommodating the requested service provider to the traffic obtaining portion 42. The traffic obtaining portion 42 stores the band used by the service provider and reported by the traffic controller 32 in the traffic storing buffer 43.

The menu optimizing portion 44 calculates the available band (=F1−F2) for each circuit accommodating the corresponding service provider from a physical band F1 which is stored in the service provider data base 46 in correspondence with each service provider, and the band F2 used by each circuit accommodating the corresponding service provider, judges whether or not a service provider can be connected in reference to the available band, the band necessary for providing a service and the maximum available band of a user terminal, and stores the result of the judgement in the menu buffer 47. The menu optimizing portion 44 also classifies the traffic on the basis of the used band F2 into heavy traffic, middle traffic, light traffic, when the service provider is judged to be connectable, creates a service selection menu PSM which reflects the traffic and transmits the service selection menu PSM to the user terminal 11a so as to display it thereon.

The service executing portion 45 judges whether or not the service provider selected by the user terminal 11a can be connected in reference to the information set in the menu buffer 47. If the service provider is connectable, the service executing portion 45 obtains the parameters (phone number and the like) necessary for setting a path from the service provider data base 46, and requests the path setting portion 33 to set a path. The path setting portion 33 may be disposed either in the network controller or a service provider.

According to this structure, a user can see a menu which dynamically reflects the traffic (heavy traffic, middle traffic, light traffic), and avoid the selection of a service provider which is so much congested that the degeneration of the service quality is apprehended. This system is also advantageous in that traffic can be dispersed.

Figure 3:
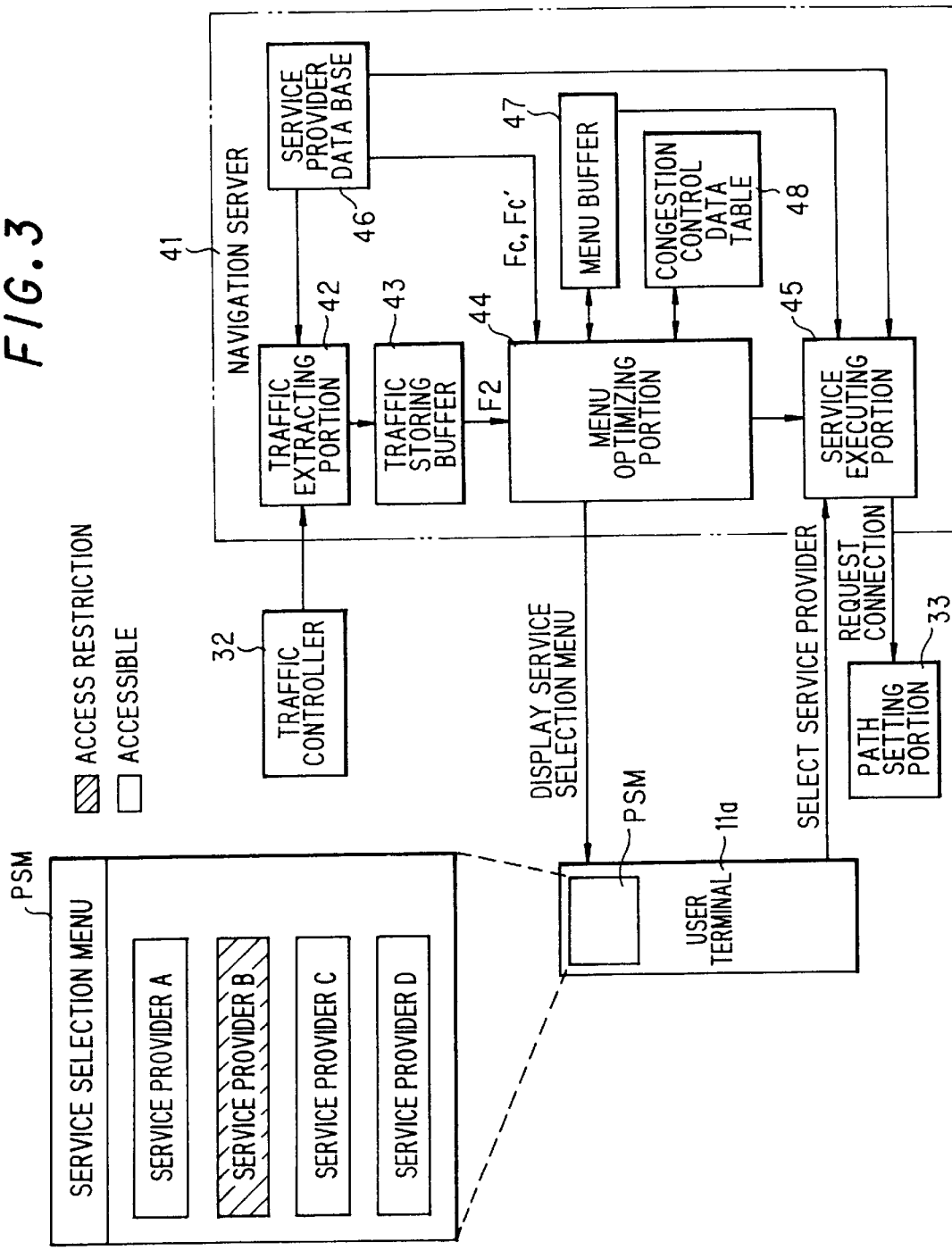
FIG. 3 is a schematic explanatory view of a second embodiment of the present invention.

(c) Schematic explanation of second embodiment (c-1) Restriction of connection due to congestion FIG. 3 is a schematic explanatory view of a second embodiment of the present invention. The same reference numerals are provided for the elements which are the same as those in FIG. 2. This embodiment is different from the first embodiment shown in FIG. 2 in that a congestion control data table 48 for storing the state of congestion of each service provider is provided.

The menu optimizing portion 44 checks the congestion control data table 48 with respect to each service provider. (1) Unless the service of the service provider is restricted (congested), the menu optimizing portion 44 obtains the band F2 used by the circuit accommodating the service provider from the traffic storing buffer 43, compares the used band F2 with a restriction band Fc of the service provider which is regarded as congestion and which is stored in advance in the service provider data base 46, and if the used band F2 is not less than the restriction band Fc, the menu optimizing portion 44 sets a restriction flag at the position of the service provider in the congestion control data table 48 and also sets a restriction code which shows the restriction of connection at the position of the service provider in the menu buffer 47. (2) On the other hand, the menu optimizing portion 44 obtains the band F2 used by the circuit accommodating the service provider from the traffic storing buffer 43, compares the used band F2 with the restriction release band Fc' of the service provider which is stored in advance in the service provider data base 46, and if the used band F2 is less than the restriction release band Fc', the menu optimizing portion 44 cancels the restriction flag at the position of the service provider in the congestion control data table 48 and also eliminates the restriction code which shows the restriction of connection at the position of the service provider in the menu buffer 47.

The menu optimizing portion 44 also creates a service selection menu PSM which can indicate that the service provider with the restriction flag set in the menu buffer 47 is restricted (cannot be connected), and displays the service selection menu PSM on the user terminal 11a.

When a service provider is selected by the user at the user terminal 11a, the service executing portion 45 refers to the menu buffer 47, and if a restriction code is set with respect to the selected service provider, the service executing portion 45 annuls the selection of the service provider by the user. In this manner, by restricting the access to a service provider when traffic congestion is continual in the circuit accommodating the service provider, it is possible to secure the service quality. That is, it is possible to prevent the problem of the low quality of service received by many users which is caused when the requests for connection are accepted without any restriction of access.

(c-2) Bypass connection

In the above-described structure, when a service provider which is restricted due to congestion, the request from a user terminal for connection to the service provider is rejected. Alternatively, it is possible to bypass the service provider so as to connect the user terminal to another service provider which provides the same service.

If the used band F2 is not less than the restriction band Fc, the menu optimizing portion 44 refers to a bypass field registered in the service provider data base 46. If bypass is instructed, the menu optimizing portion 44 does not set a restriction flag in the congestion control data table 48 but sets a bypass code at the position of the service provider in the menu buffer 47. When the user selects a predetermined service provider at the user terminal 11a, the service executing portion 45 refers to the menu buffer 47 so as to judge whether or not a bypass code is set at the position of the service provider. If the answer is YES, the service executing portion 45 obtains a substitute service provider from the service provider data base 46, and requests the path setting portion 33 to set a path between the user terminal 11a and the substitute service provider.

In this manner, even if the circuit accommodating a requested service provider is congested, it is possible to bypass the service provider to another service provider having the same function and enough capacity, thereby reducing the number of user terminals who are refused to connect. In addition, tie-up between service providers and grouping service providers are possible.

(d) Schematic explanation of third embodiment

Figure 4:
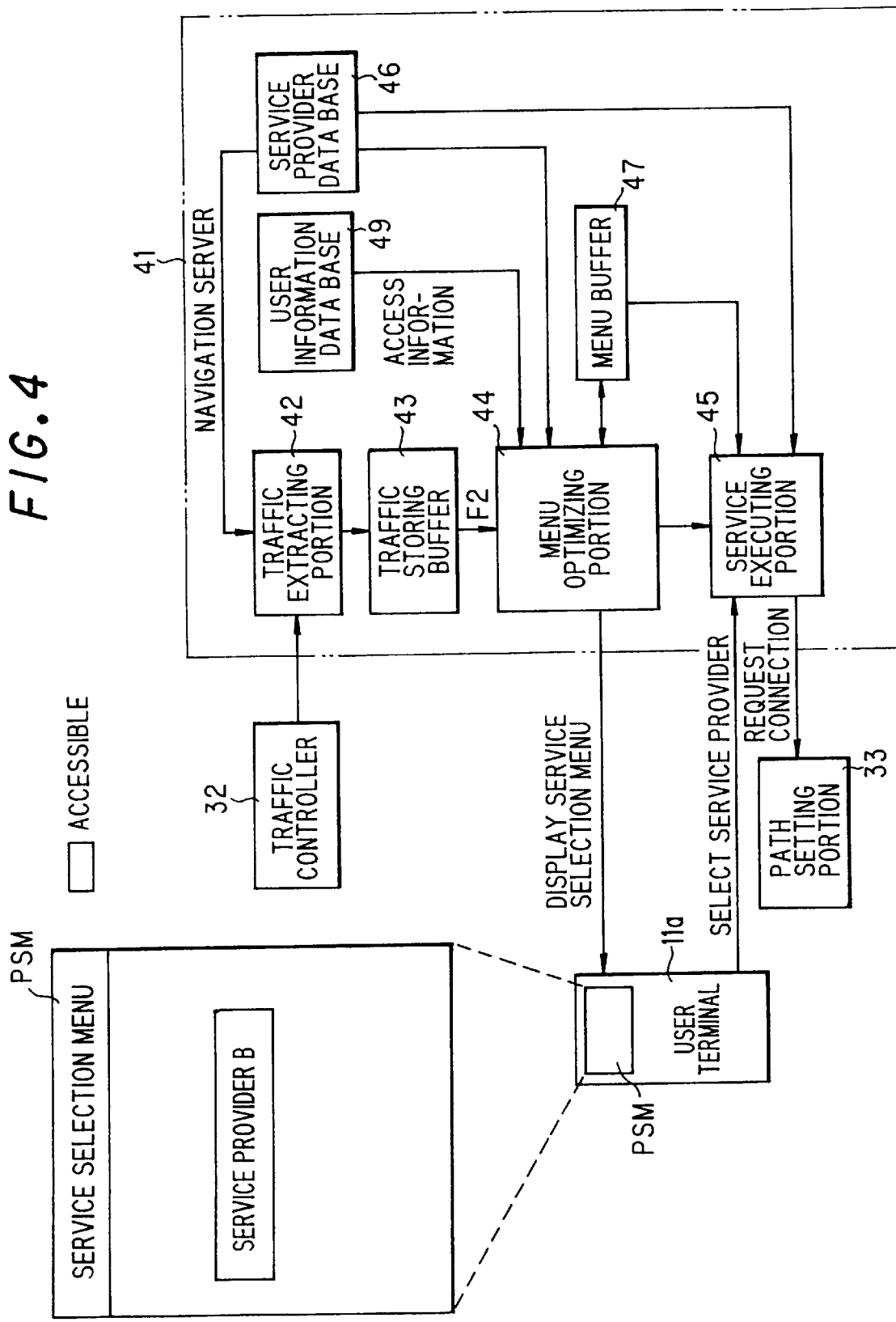
FIG. 4 is a schematic explanatory view of a third embodiment of the present invention.

FIG. 4 is a schematic explanatory view of a third embodiment of the present invention. The same reference numerals are provided for the elements which are the same as those in FIG. 2. This embodiment is different from the first embodiment shown in FIG. 2 in that a user information data base (user terminal data base) 49 is provided for storing the access information showing whether or not a user terminal is accessible to each service provider. The access information includes, for example, (1) the subscription information showing whether or not the user terminal 11a can receive the service from a service provider under contract with the service provider, and (2) the access restriction information which is set of the user's own will and which shows whether or not the access to a specific service provider is restricted. For example, the user may restrict access to a service provider which provides a pornographic picture.

When the user terminal 11a is connected to the navigation server 41, the menu optimizing portion 44 refers to the access information about each service provider which is stored in the user information data base 49, obtains a service provider to which the user terminal 11a is accessible, and stores the possibility of access at the position of the service provider in the menu buffer 47. The menu optimizing portion 44 then obtains the band used by the circuit accommodating the accessible service provider from the traffic buffer storing buffer 43, obtains the available band from the used band, and judges whether or not the connection to the service provider is possible in consideration of the available band, the maximum available band of the user terminal 11a and the band necessary for the offer of the service. The menu optimizing portion 44 stores the result of the judgement in the menu buffer 47, creates a service selection menu PSM which reflects the content (possibility of connection) of the menu buffer 47 and displays the service selection menu PSM on the user terminal 11a.

When a service provider is selected by the user at the user terminal 11a, the service executing portion 45 judges whether or not connection is possible with reference to the menu buffer 47, and if the answer is in the negative, the service executing portion 45 annuls the selection of the service provider, while if the answer is in the affirmative, the service executing portion 45 requests the path setting portion 33 to set a path between the user terminal 11a and the service provider.

In the above explanation, the performance of the user terminal or a service provider is not considered, but it is possible to take it into consideration. In this case, the performance such as the decoding system of each user terminal is stored in the user information data base 49, and the performance such as the encoding system of each service provider is stored in the service provider data base 46. If an accessible service provider is recognized on the basis of the access information, the menu optimizing portion 44 compares the performance of the user terminal 11a with the performance of the service provider so as to judge whether or not the user terminal 11a can access the service provider, and stores the result of the judgment at the position of the service provider in the menu buffer 47. Thereafter, the above-described control is executed.

In this manner, since a service selection menu is optimized so as to be suitable to the taste of a user and the performance of a user terminal, that is, since only accessible service providers are displayed, the user is capable of efficiently selecting a service provider, avoiding the invalid hold of the network resource, and further favorably reducing the access rate.

(e) Schematic explanation of fourth embodiment

Figure 5:
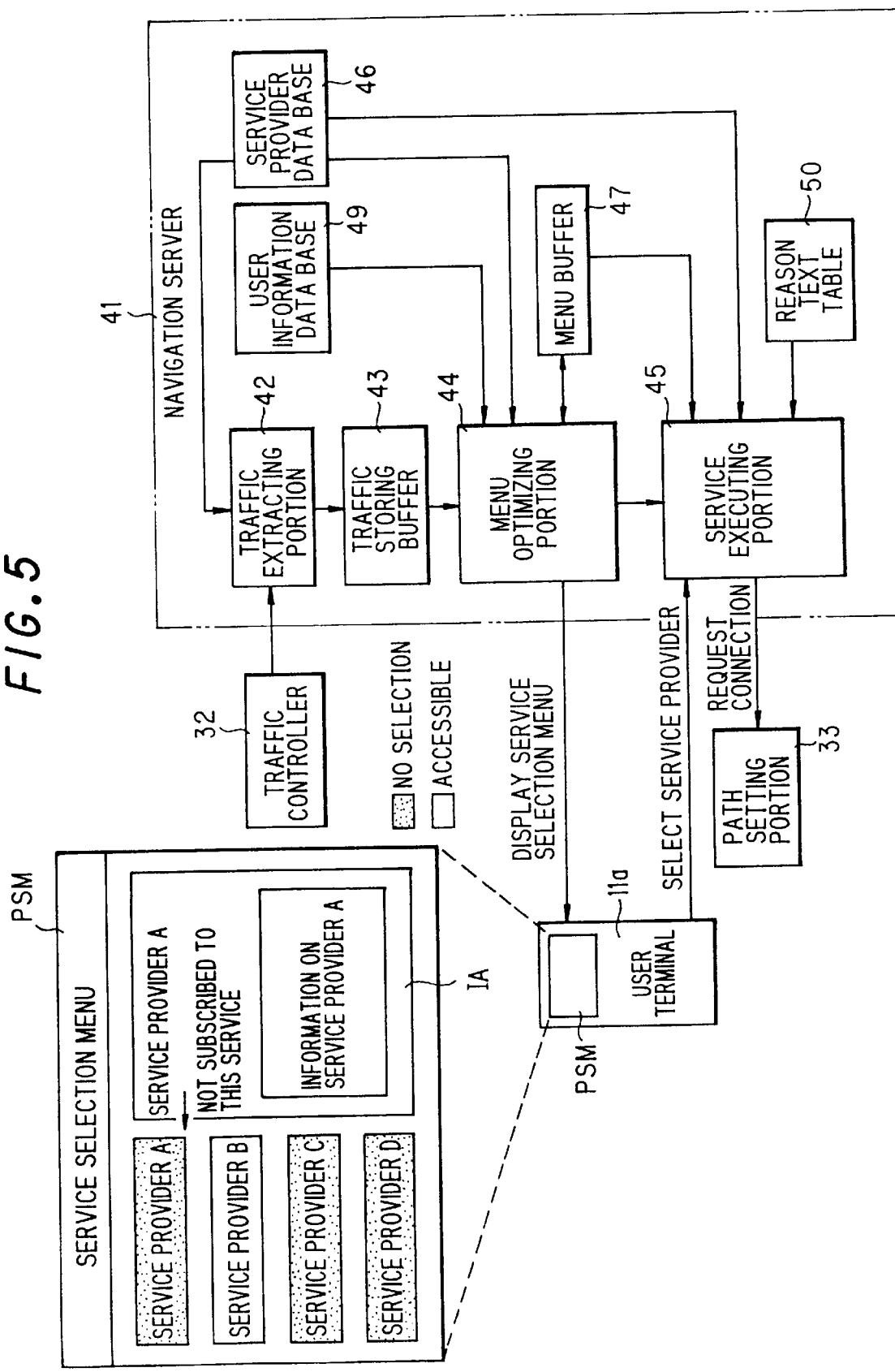
FIG. 5 is a schematic explanatory view of a fourth embodiment of the present invention.

FIG. 5 is a schematic explanatory view of a fourth embodiment of the present invention. The same reference numerals are provided for the elements which are the same as those in FIG. 4. This embodiment is different from the third embodiment shown in FIG. 4 in that a reason text table 50 for storing a reason code corresponding to the reason for the impossibility of selection of a service provider and the message conveying the reason in correspondence with each other is provided.

When it is impossible to connect the user terminal 11a to a service provider, the menu optimizing portion 44 stores the reason code which corresponds to the reason for the impossibility in the menu buffer 47 and creates a service selection menu PSM which enables the user terminal 11a to discriminate the possibility of selection of a service provider, and displays the service selection menu PSM on the user terminal 11a. When a predetermined service provider, for example a service provider A is selected by the user terminal 11a, the service executing portion 45 extracts the display information of the service provider A from the service provider data base 46, and displays it in the information display area IA of the service selection menu PSM. If the reason code for the impossibility of connection of the service provider A is set in the menu buffer 47, the service executing portion 45 obtains the message corresponding to the reason code from the reason text table 50, and displays the reason for the impossibility of connection in the information display area IA of the service selection menu PSM. According to this structure, the user can see the information on a service provider in the service selection menu PSM as a good guide to the selection of a service provider. In addition, when the user terminal cannot be connected, since the reason for the impossibility is displayed, the user can improve the environment or expunge the service provider from the list of the objects of access with reference to the reason.

(f) Schematic explanation of fifth embodiment

Figure 6:
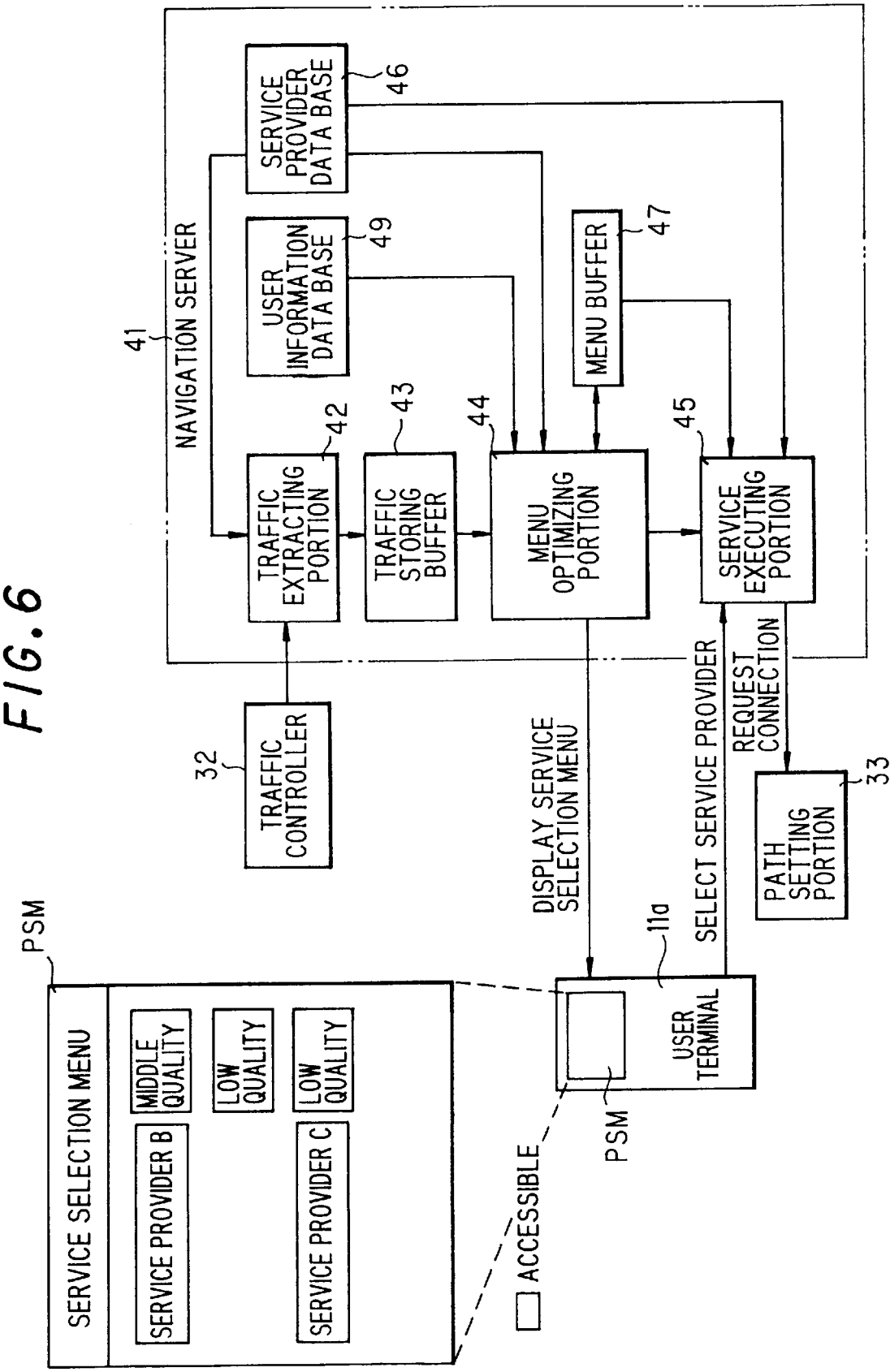
FIG. 6 is a schematic explanatory view of a fifth embodiment of the present invention.

FIG. 6 is a schematic explanatory view of a fifth embodiment of the present invention. The same reference numerals are provided for the elements which are the same as those in FIG. 4.

The menu optimizing portion 44 judges whether or not an accessible service provider can be connected at each quality level in consideration of the available band of the circuit accommodating the service provider, the maximum available band of the user terminal 11a and the band necessary for the offer of the service at each quality level (heavy/middle/low quality level), stores the result of the judgement in the menu buffer 47, creates a service selection menu PSM which reflects the result of the judgement and displays the service selection menu PSM on the user terminal 11a. When a service provider and a quality level are selected by the user terminal 11a, the service executing portion 45 judges whether or not the service provider can provide the service at the selected quality level with reference to the menu buffer 47, and annuls the selection of the service provider if the answer is NO, while requesting the path setting portion 33 to set a path between the user terminal 11a and the service provider if the answer is YES. According to this structure, since it is possible to designate the quality level of the service, the user can receive the service at the desired quality level. In addition, the user has only to designate a high, middle or low quality without the need for indicating a strict parameter.

(g) Schematic explanation of sixth embodiment

Figure 7:
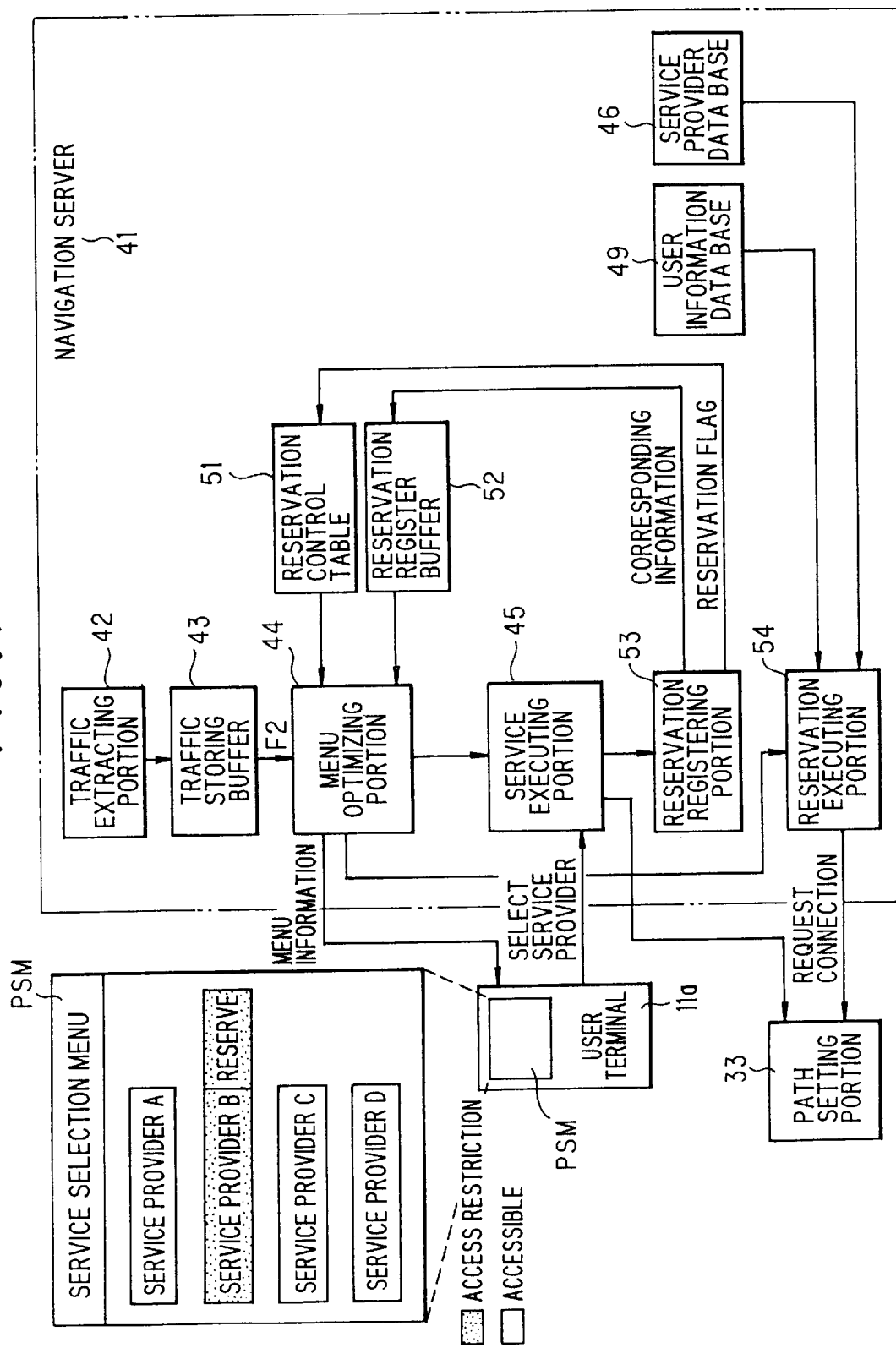
FIG. 7 is a schematic explanatory view of a sixth embodiment of the present invention.

FIG. 7 is a schematic explanatory view of a sixth embodiment of the present invention. The same reference numerals are provided for the elements which are the same as those in FIG. 4. In FIG. 7, the reference numeral 51 represents a reservation control table for storing the information (reservation flag) which specifies a reserved service provider, 52 a reservation register buffer for storing the information on the user terminal which has reserved the service provider and the reserved service provider in correspondence with each other, 53 a reservation registering portion for setting the corresponding information in the reservation control table 51 and the reservation register buffer 52, and 54 a reservation executing portion for controlling the operation of setting a path between the user terminal which has reserved the service provider and the reserved service provider.

When the user terminal 11a is connected to the navigation server 41, the menu optimizing portion 44 obtains the available band of the circuit accommodating the service provider with reference to the traffic of the circuit, and judges whether or not the connection to the service provider is possible on the basis of the available band, the maximum available band of the user terminal 11a and the band necessary for the offer of the service. If there is a service provider which cannot be connected due to a shortage of available band, the menu optimizing portion 44 creates a service selection menu PSM which enables the user terminal 11a to discriminate the impossibility of connection of the service provider and to reserve the service provider, and displays the service selection menu PSM on the user terminal 11a. When the user terminal 11a selects a service provider which is connectable, the service executing portion 45 requests the path setting portion 33 to set a path between the user terminal 11a and the service provider. If a service provider which cannot be connected is reserved by the user terminal 11a, the service executing portion 45 starts the reservation registering portion 53.

The reservation registering portion 53 sets the information on the user terminal 11a which has reserved the service provider and the reserved service provider in the reservation register buffer 52 in correspondence with each other, and also sets a reservation flag at the position of the reserved service provider in the reservation control table 51. In this manner the reservation of the service provider which cannot be connected due to a shortage of the available band is completed.

The menu optimizing portion 44 obtains the reserved service provider with reference to the reservation control table 51 every time another user terminal is connected to the navigation server 41 and started, and judges whether or not the available band of the reserved service provider is not less than the band necessary for the offer of the service. If the answer is in the affirmative, the menu optimizing portion 44 starts the reservation executing portion 54. The reservation executing portion 54 obtains the reserved service provider and the user terminal 11a stored in correspondence with the service provider from the reservation register buffer 52 via the menu optimizing portion 44, obtains the information (phone number and the like) necessary for setting a path from the user information data base 49 and the service provider data base 46 and requests the path setting portion 33 to set a path between the user terminal 11a and the service provider.

According to this structure, it is possible to reserve a service provider with heavy traffic and to automatically connect a user terminal to the service provider when the traffic reduces. In other words, it is possible to securely access a service provider by reservation which is difficult to access. In addition, since it is not necessary to access the service provider again and again to no avail, it is favorably possible to reduce the access rate for the navigation server.

(h) Schematic explanation of seventh embodiment

Figure 8:
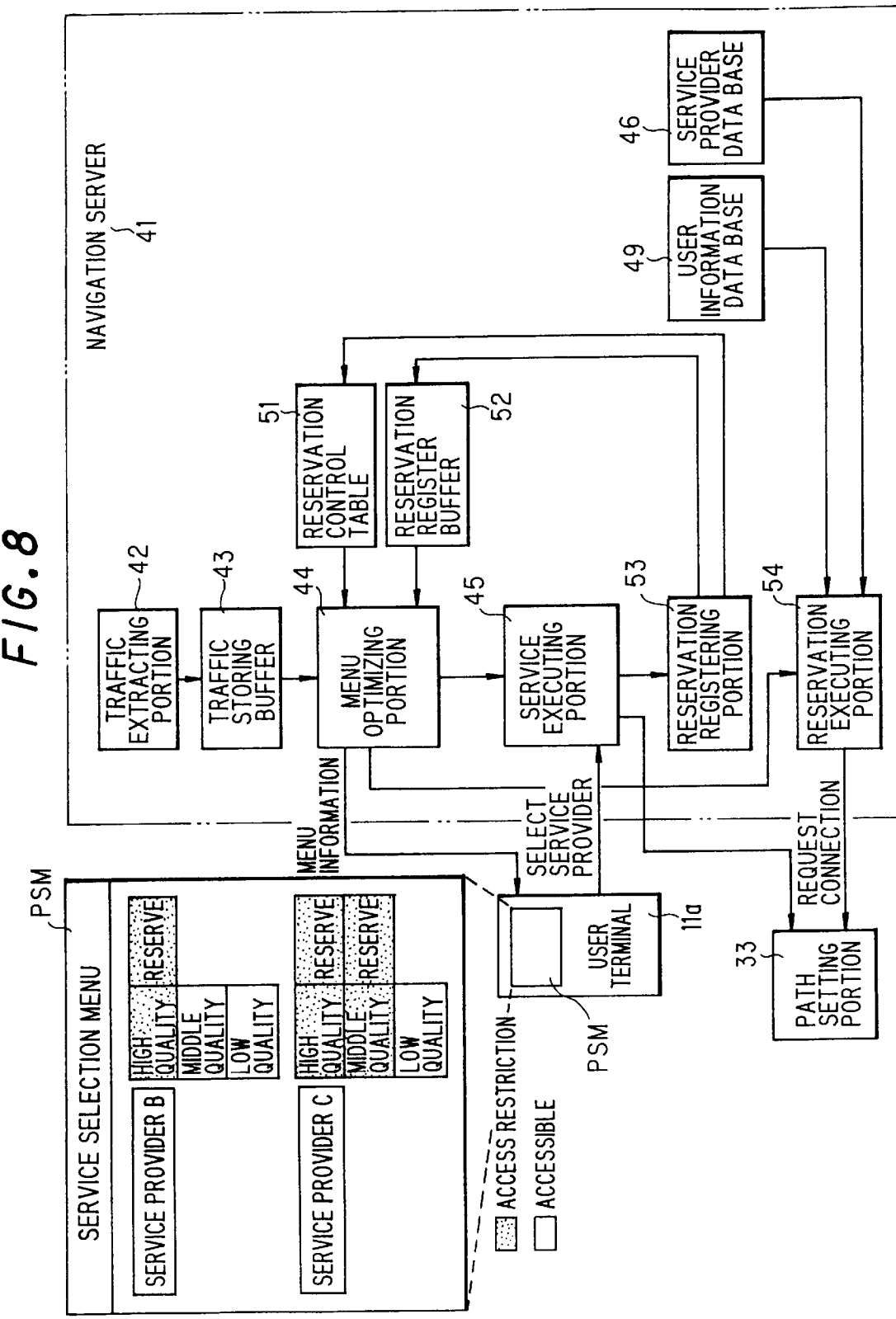
FIG. 8 is a schematic explanatory view of a seventh embodiment of the present invention.

FIG. 8 is a schematic explanatory view of a seventh embodiment of the present invention. The same reference numerals are provided for the elements which are the same as those in FIG. 7.

The menu optimizing portion 44 judges whether or not a service provider can be connected at each quality level in consideration of a available band of a circuit accommodating each service provider, the maximum available band of the user terminal 11a and the band necessary for providing a service at each quality level, creates a service selection menu PSM which enables the user terminal 11a to discriminate a quality level and a service provider when the service provider cannot be connected at the predetermined quality level due to a shortage of available band and to reserve the service provider, and displaying the service selection menu PSM on the display of the user terminal 11a. When the user terminal 11a selects a service provider and a quality level and if the service provider can be connected at the quality level, the service executing portion 45 requests the path setting portion 33 to set a path between the user terminal 11a and the service provider. If a service provider which cannot be connected is reserved by the user terminal 11a, the service executing portion 45 starts the reservation registering portion 53.

The reservation registering portion 53 sets the information on the user terminal 11a which has reserved the service provider, and the reserved service provider and quality level in the reservation register buffer 52 in correspondence with each other, and also sets a reservation flag at the position of the reserved service provider in the reservation control table 51. In this manner the reservation of the service provider at the predetermined quality level which cannot be connected due to a shortage of available band is completed.

The menu optimizing portion 44 obtains the reserved service provider with reference to the reservation control table 51 every time another user terminal is connected to the navigation server 41 and started, and judges whether or not the available band of the reserved service provider is not less than the band necessary for the offer of the service at the reserved quality level. If the answer is in the affirmative, the menu optimizing portion 44 starts the reservation executing portion 54. The reservation executing portion 54 obtains the reserved service provider and the user terminal 11a stored in correspondence with the service provider from the reservation register buffer 52 via the menu optimizing portion 44, obtains the information (phone number and the like) necessary for setting a path from the user information data base 49 and the service provider data base 46 and requests the path setting portion 33 to set a path between the user terminal 11a and the service provider.

According to this structure, it is possible to securely reserve the service at the quality level which a user demands. For example, when a user wants to enjoy a movie at a high quality but the service can only be provided at a low quality level due to heavy traffic, if the user reserves the movie at a high quality, it is certain that the user can receive the service at a high quality when the time comes.

(B) Detailed Structure (a) Structure of network

Figure 9:
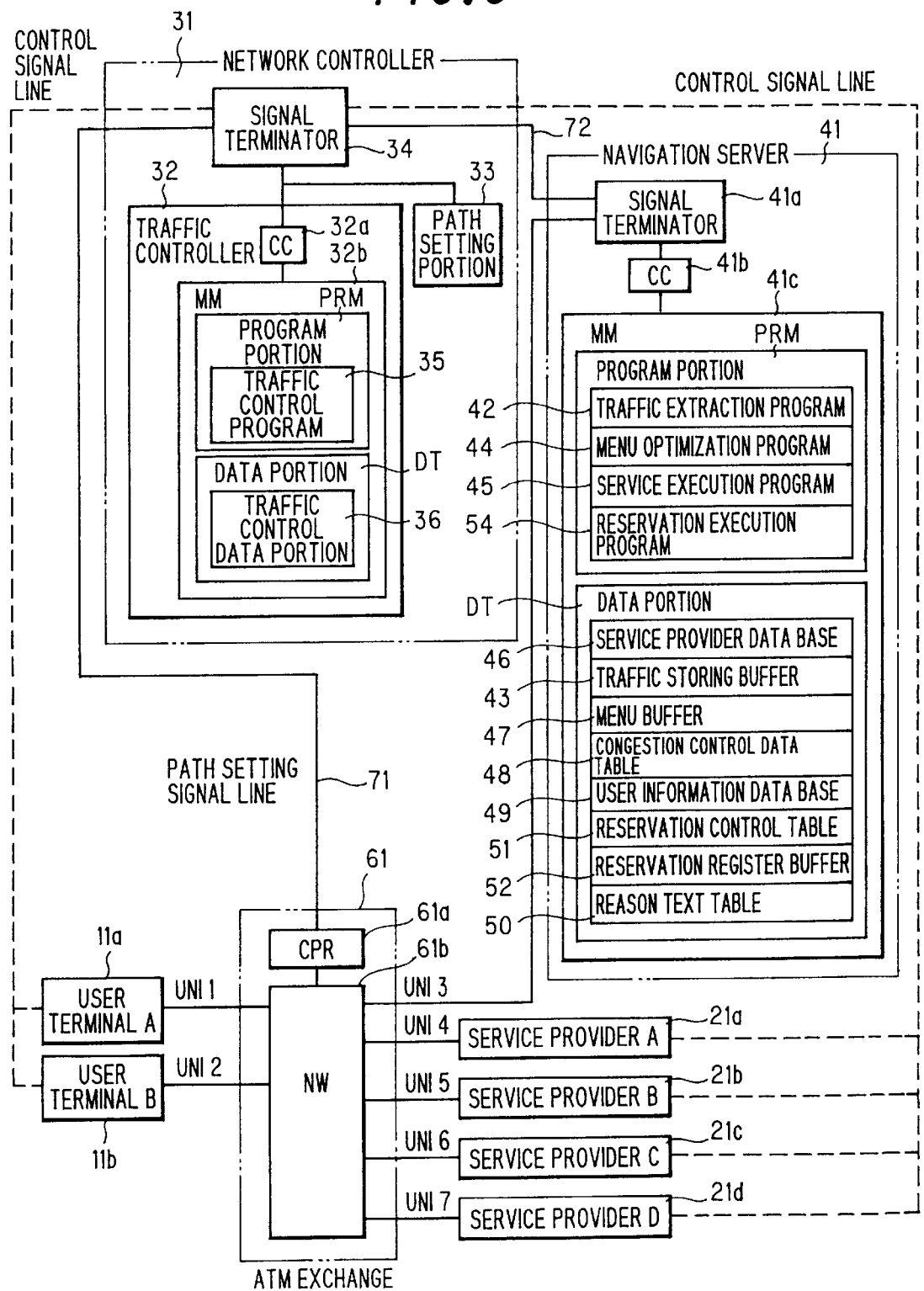
FIG. 9 shows the structure of a network system.

FIG. 9 shows the structure of a network system in the present invention. In FIG. 9, the reference numerals 11a and 11b represent user terminals A, B, 21a to 21d service providers A, B, C, D for a providing multimedia service, 31 a network controller, 41 a navigation server, and 61 an ATM exchange. The network controller 31 is connected to the ATM exchange 61 by a path setting signal line 71, and through the path setting signal line 71 a signalling message, a maintenance operation message, etc. are transmitted and received between the network controller 31 and the ATM exchange 61. The ATM exchange 61 is connected to the user terminals A, B, the navigation server 41, the service providers A, B, C, D, by respective UNIs (User Network Interface, physical line connecting a network to a terminal on which a data stream flows). The network controller 31 is connected to the user terminals A, B, the navigation server 41, the service providers A, B, C, D by the respective control signal lines. A resource change request message and a pass change request message from each terminal are transmitted and received through the control signal lines. The control signal line 72 between the network controller 31 and the navigation server 41 transmits a traffic inquiry message and a reply message therethrough.

The ATM exchange 61 includes a call control processor (CPR) 61a and an ATM switch portion (NW) 61b. The call control processor (CPR) 61a controls the resource and the connection of a path in accordance with a request message from the path setting signal line 71. The ATM switch portion 61b switches paths on the instruction of the call control processor 61a. The network controller 31 is composed of a traffic controller 32, a path setting portion 33 and a signal terminator 34. The signal terminator 34 controls the transmission and reception of a message, and it is connected to the path setting signal line 71, the control signal line 72, etc. so as to physically terminate a signal message and transmit the message received to the traffic controller 32.

The path setting portion 33 causes the ATM exchange 61 to set a path between a predetermined user terminal and a predetermined service provider on the basis of the pass setting request from the navigation server 41. The path setting portion 33 may not always be accommodated in the network controller 31 but it may be disposed in a different device. The traffic controller 32 is composed of a processor (CC) 32a and a main storage (MM) 32b. The processor 32a takes a program stored in the main storage 32b and executes it. The main storage 32b is provided with a program portion PRM and a data portion DT. A traffic control program 35 is stored in the program portion PRM, while traffic control data 36 for each circuit is stored in the data portion DT.

The navigation server 41 is composed of a signal terminator 41a, a processor (CC) 41b and a main storage (MM) 41c. The signal terminator 41a terminates a signal message transmitted through the control signal line and the data stream transmitted through the UNI. The main storage 41c is provided with a program portion PRM and a data portion DT, and a traffic extraction program 42, a menu optimization program 44, a service data execution program 45 and a reservation execution program 54 are stored in the program portion PRM. The data portion DT is provided with service provider data base 46, traffic storing buffer 43, menu buffer 47, congestion control data table 48, user information data base 49, reservation control table 51, reservation register buffer 52 and reason text table 50 for storing a message conveying the reason for the impossibility of connection in correspondence with a reason code.

Each of the user terminals and service providers is provided with a signal terminator (not shown) for terminating a signal message and a data stream transmitted through the UNI, a processor (CC) (not shown) for controlling the transmission and reception of a signal message and the execution of a service, and a main storage (MM) (not shown). Although the network controller 31 and the navigation server 41 are composed of different hardwares in the network shown in FIG. 9, they may be composed of the same hardware.

(b) Structure of data portion in navigation server

FIGS. 10A to 10C and FIGS. 11A to 11E are explanatory views of the structures of various data stored in the data portion DT of the navigation server 41.

(b-1) Service provider data base

Figure 10A:
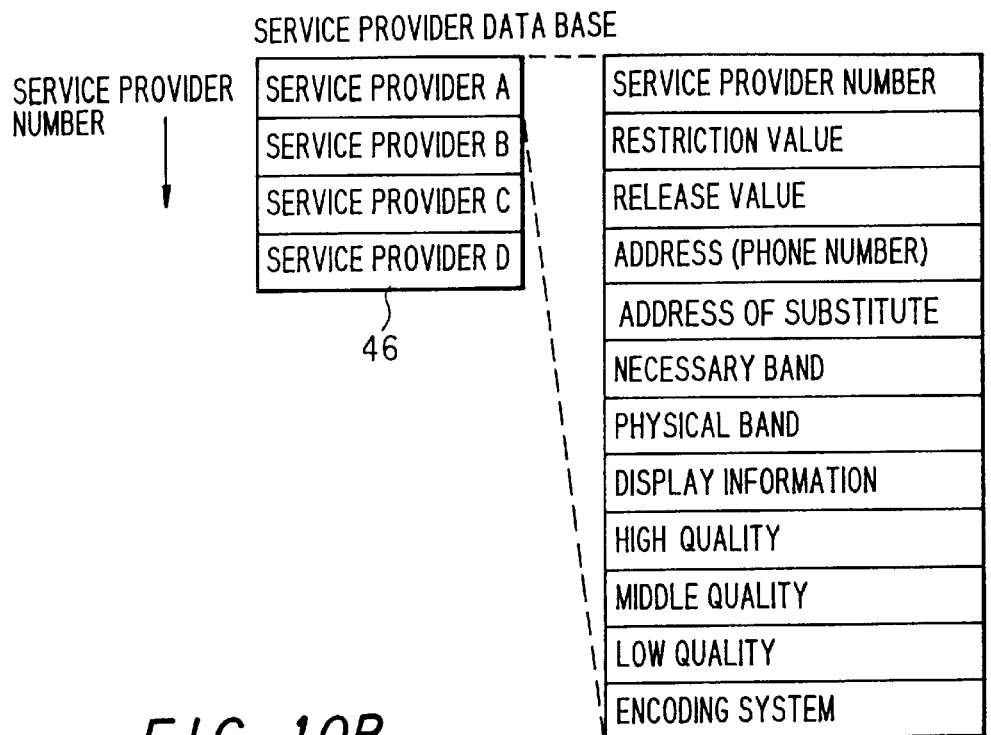
FIGS. 10A to 10C are explanatory views of the structure of first data.

FIG. 10A shows the structure of the service provider data base 46. What is registered for each service provider in the service provider data base 46 are (1) service provider number, (2) restriction value (restriction band) which is regarded as congestion, (3) congestion release value (congestion release band) which is regarded as the release of congestion, (4) address such as a phone number of a service provider, (5) address of a substitute service provider which executes the service in place of the service provider which cannot be connected due to congestion, (6) band necessary for the offer of a service, (7) physical band accommodating a service provider, (8) display information of a service provider, (9) band necessary for a high-quality service, (10) band necessary for a middle-quality service, (11) band necessary for a low -quality service, and (12) performance (e.g. encoding system) of a service provider.

(b-2) User information data base

Figure 10B:
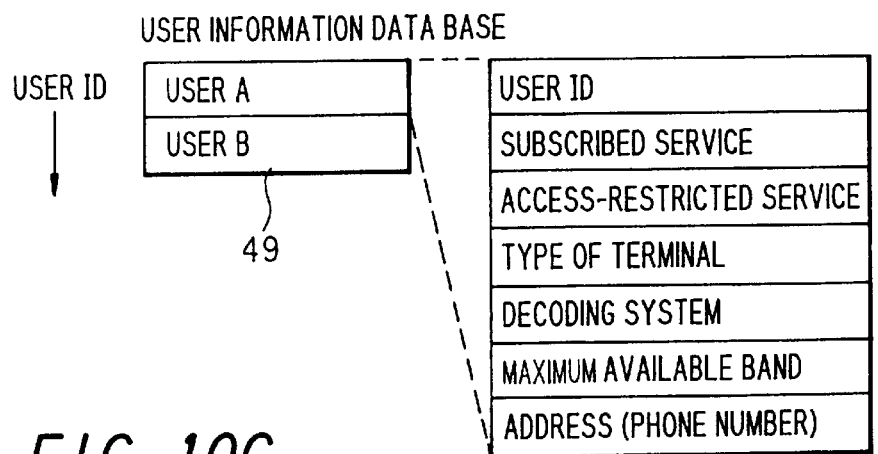

FIG. 10B shows the structure of the user information data base 49. What is registered for each user terminal in the user information data base 49 are (1) user ID, (2) name of a service provider whose service a user can receive under contract (subscription), (3) name of a service provider which is rejected of the user's own will (taste) (access restriction), (4) type of user terminal, (5) performance such as a decoding system of a user terminal, (6) maximum available band and (7) address such as a phone number.

(b-3) Menu buffer

Figure 10C:
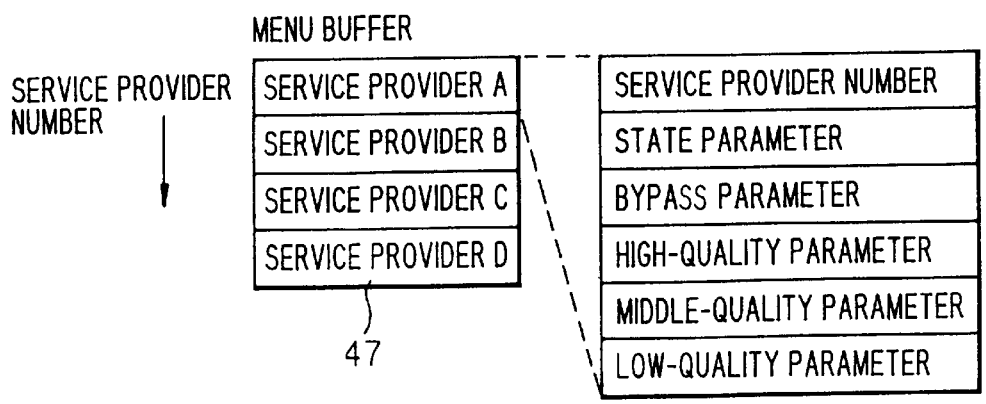

FIG. 10C shows the structure of the menu buffer 47. The menu buffer 47 is provided, for each service provider, with (1) service provider number field, (2) traffic parameter field for storing the possibility of connection, the traffic (high/middle/light traffic) of the circuit accommodating a service provider when connection is possible, and the reason (impossibility of capture of resource, restriction, rejection of connection, no contract) for the impossibility of connection in the form of a state code, (3) bypass parameter field for storing a bypass parameter showing whether or not there is set a substitute service provider for providing the same service in place of the selected service provider which cannot be connected due to a shortage of available band of the circuit which accommodates the service provider, and (4) high-quality parameter field, middle-quality parameter field and low-quality parameter field for setting whether or not the service is possible at the respective qualities.

(b-4) Traffic storing buffer

FIG. 11A shows the structure of the traffic storing buffer 43. The traffic storing buffer 43 is provided with (1) a service provider number field and (2) a traffic state field for storing the traffic of the circuit accommodating a service provider, for each service provider.

(b-5) Congestion control table

FIG. 11B shows the structure of the congestion control table 48. The congestion control table 48 is provided with (1) a service provider number field and (2) a reservation flag field for storing a reservation flag indicating that a service provider is reserved, for each service provider.

(b-6) Reservation register buffer

FIG. 11D shows the structure of the reservation register buffer 52. The reservation register buffer 52 is provided with (1) a reserved service provider number field, (2) a service level field for storing the reserved service quality level, and (3) a user ID field for storing the ID of a reserved user terminal, for each reservation information.

(b-7) Reason text table

FIG. 11E is an explanatory view of the reason text table 50. The table 50 stores the reason (impossibility of capture of resource, restriction, rejection of connection, no contract) in correspondence with the reason code.

(c) Process for creating menu which reflects traffic

Figure 12:
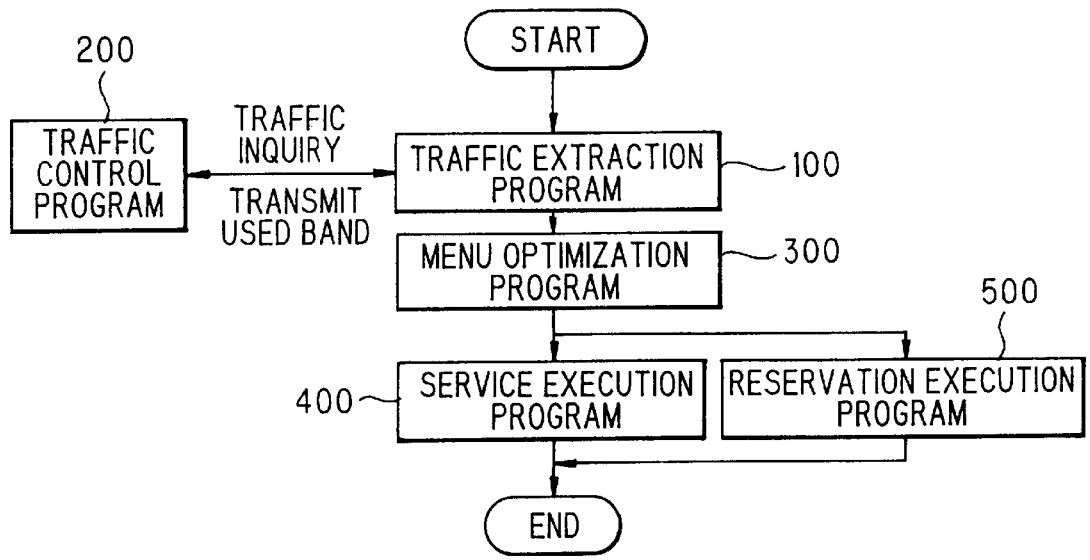
FIG. 12 is an entire flowchart of a navigation control process.
Figure 13:
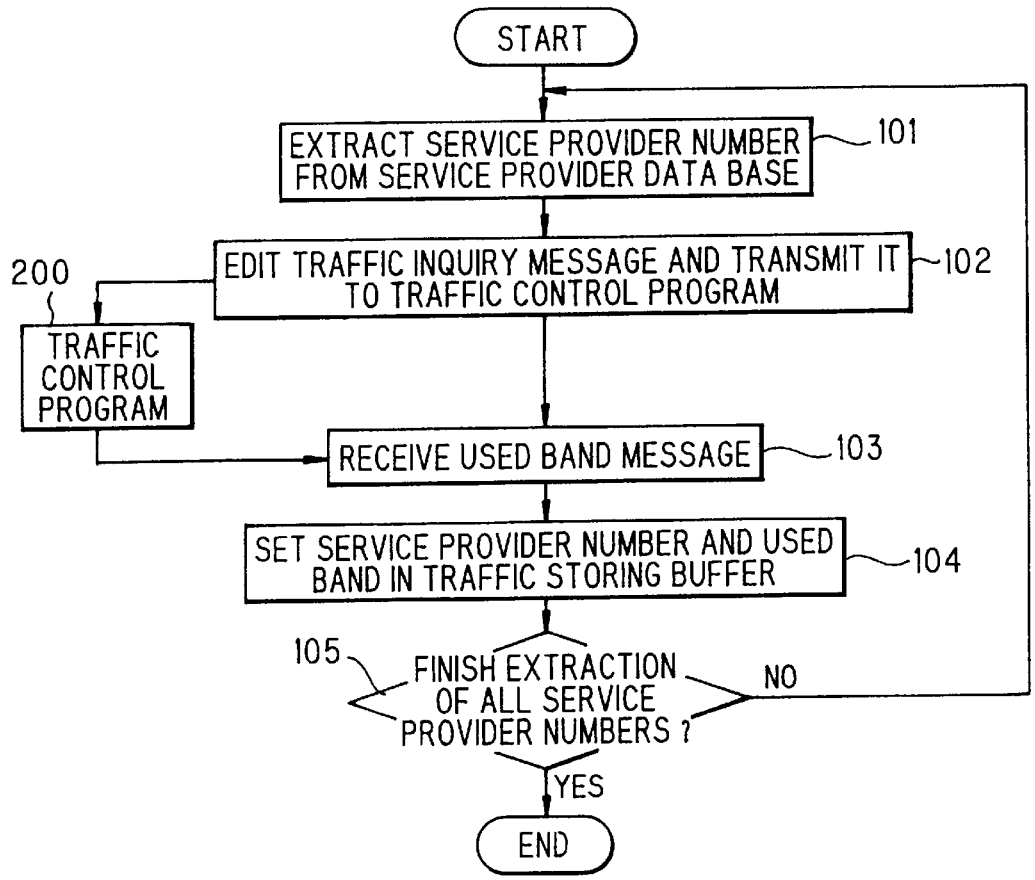
FIG. 13 is a flowchart of a traffic extraction program.
Figure 14:
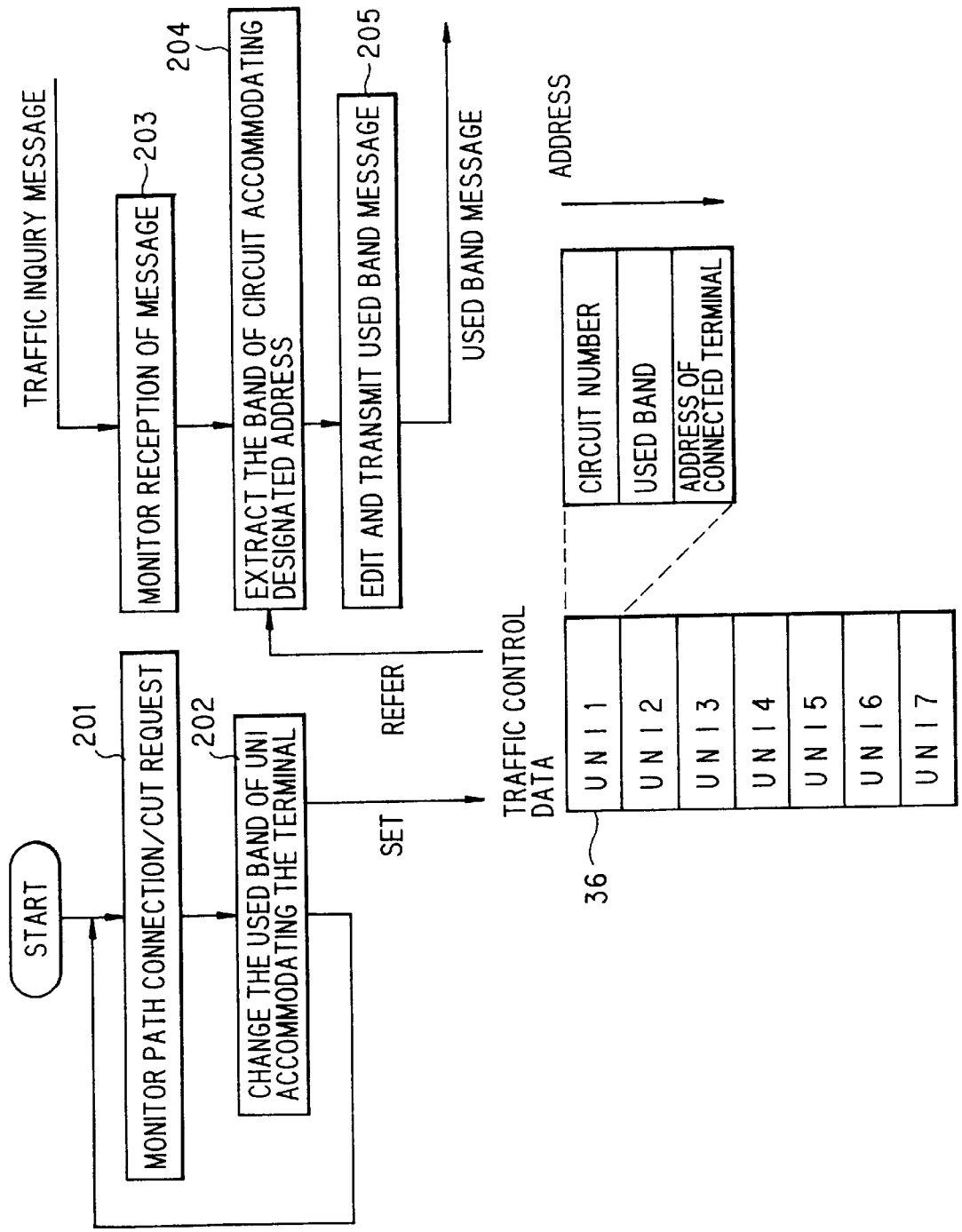
FIG. 14 is a flowchart of a traffic control program.
Figure 15:
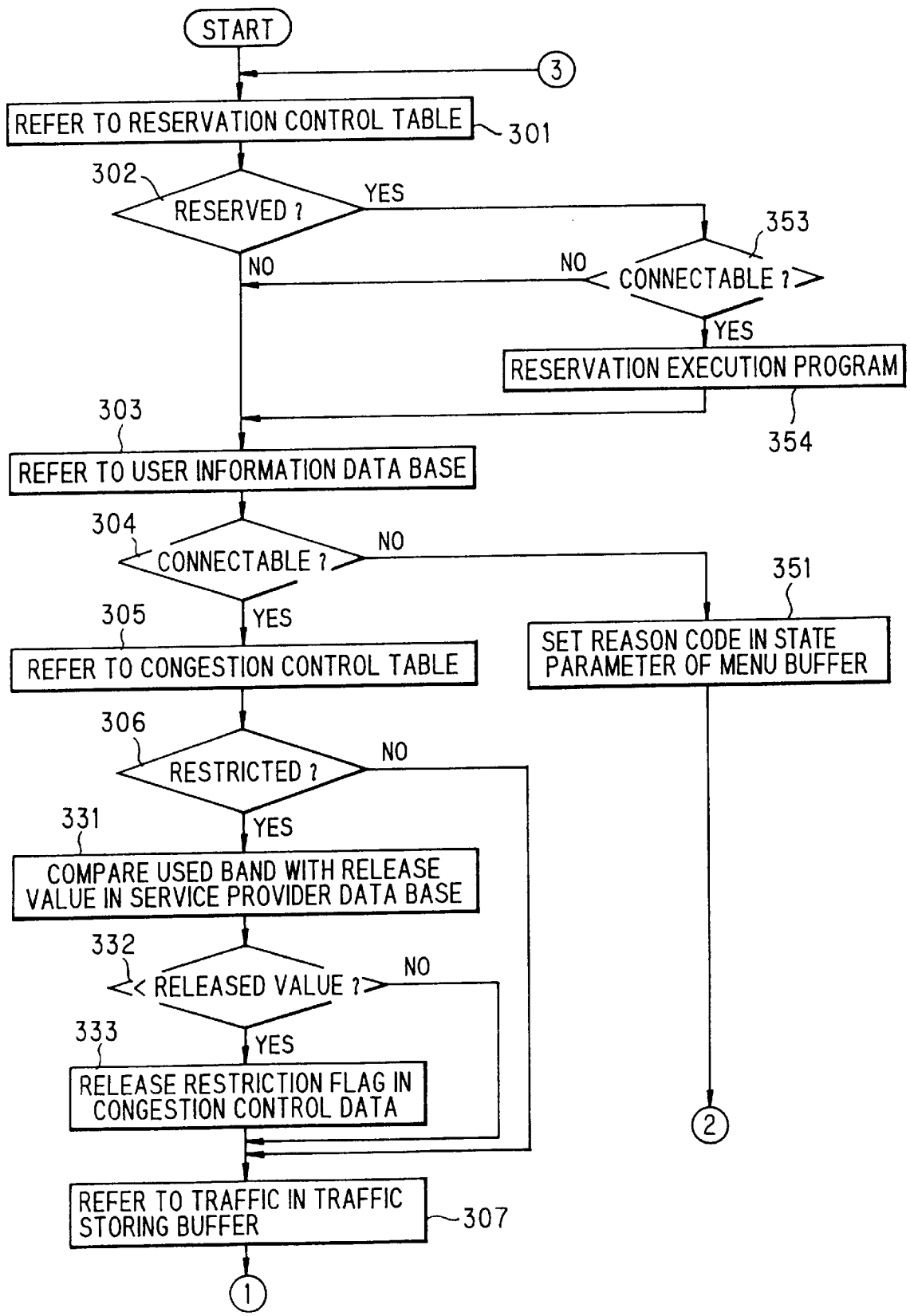
FIG. 15 is a flowchart of a first menu optimizing program.
Figure 16:
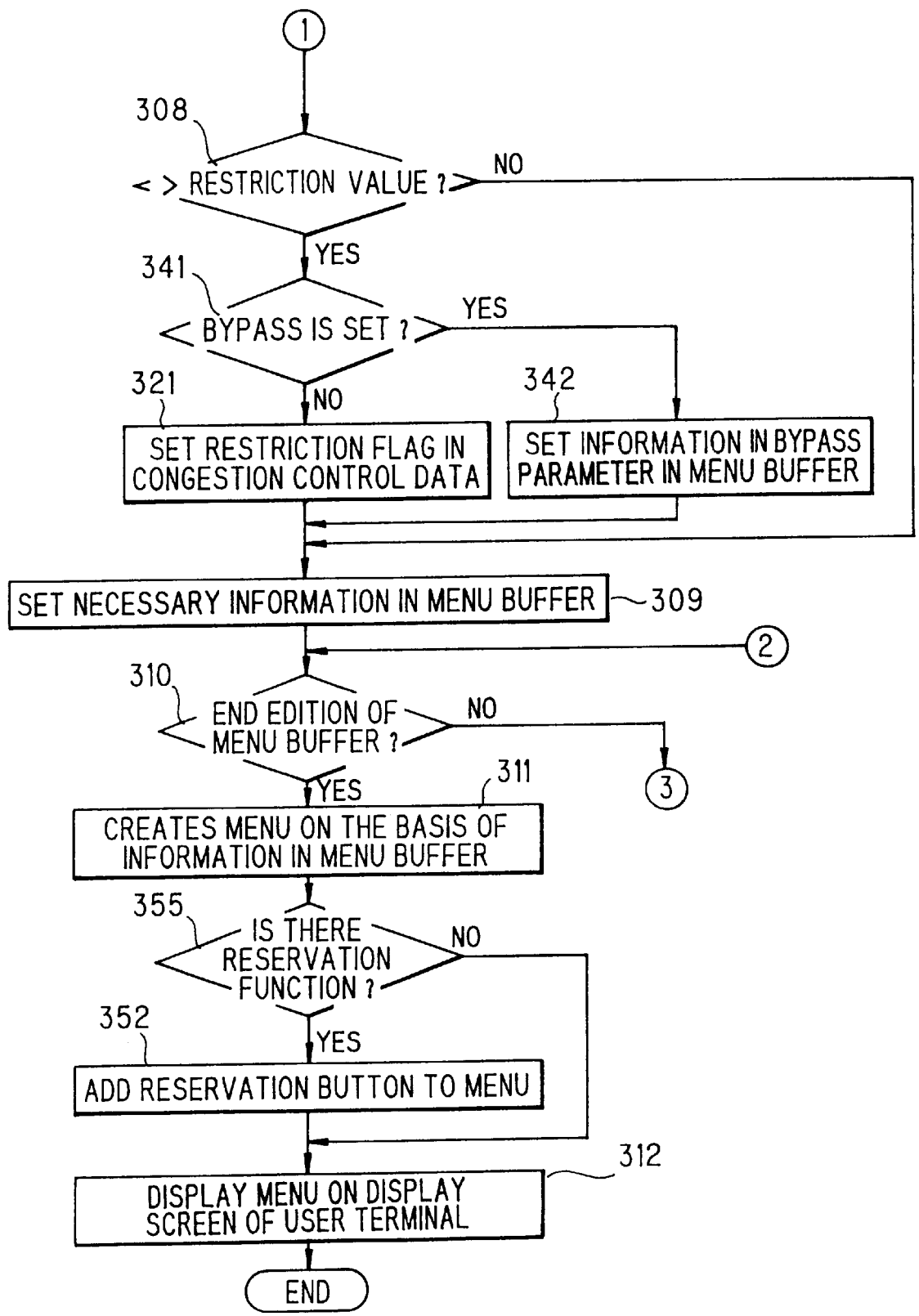
FIG. 16 is a flowchart of a second menu optimizing program.
Figure 17:
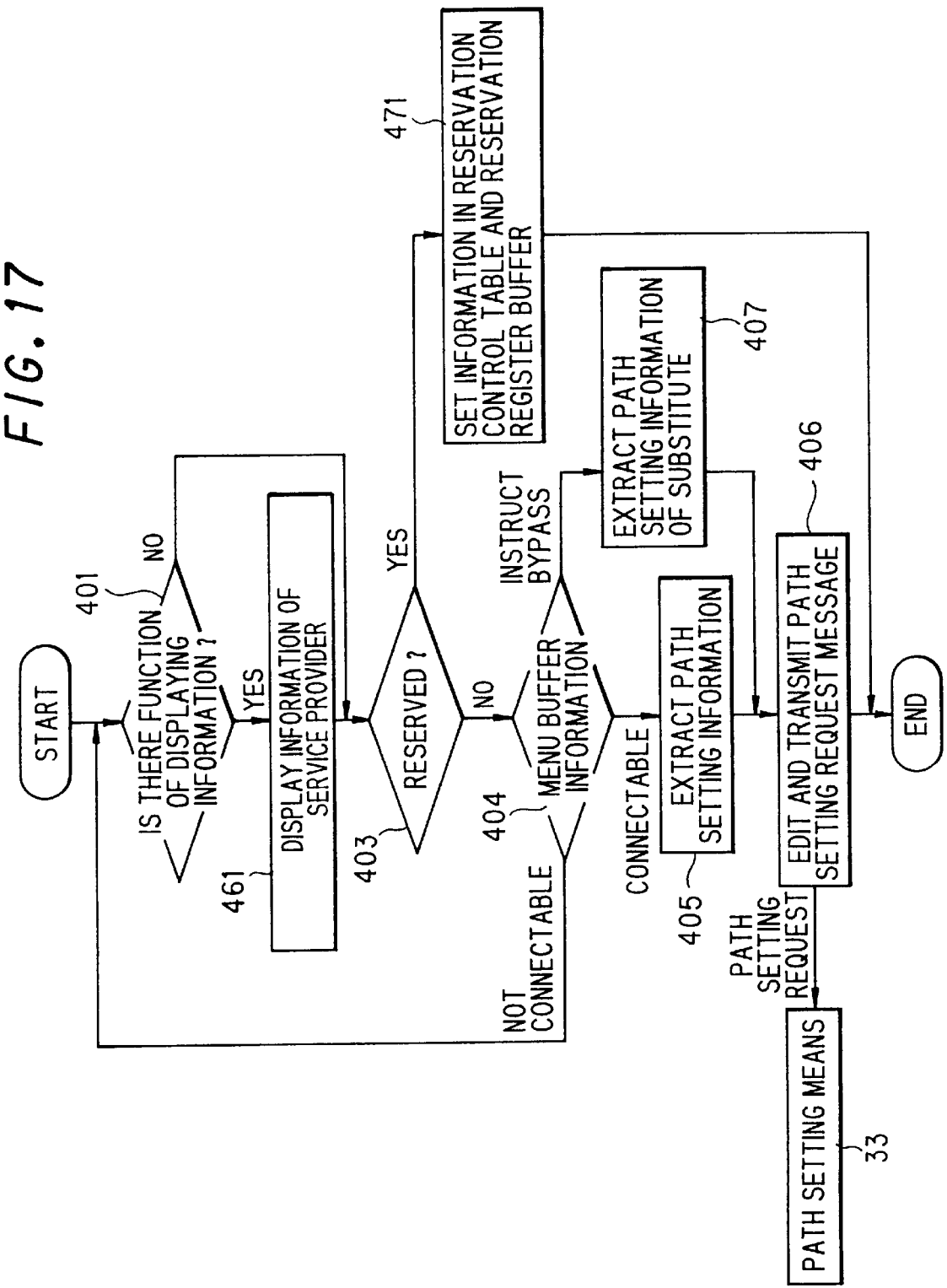
FIG. 17 is a flowchart of a service executing program.
Figure 18:
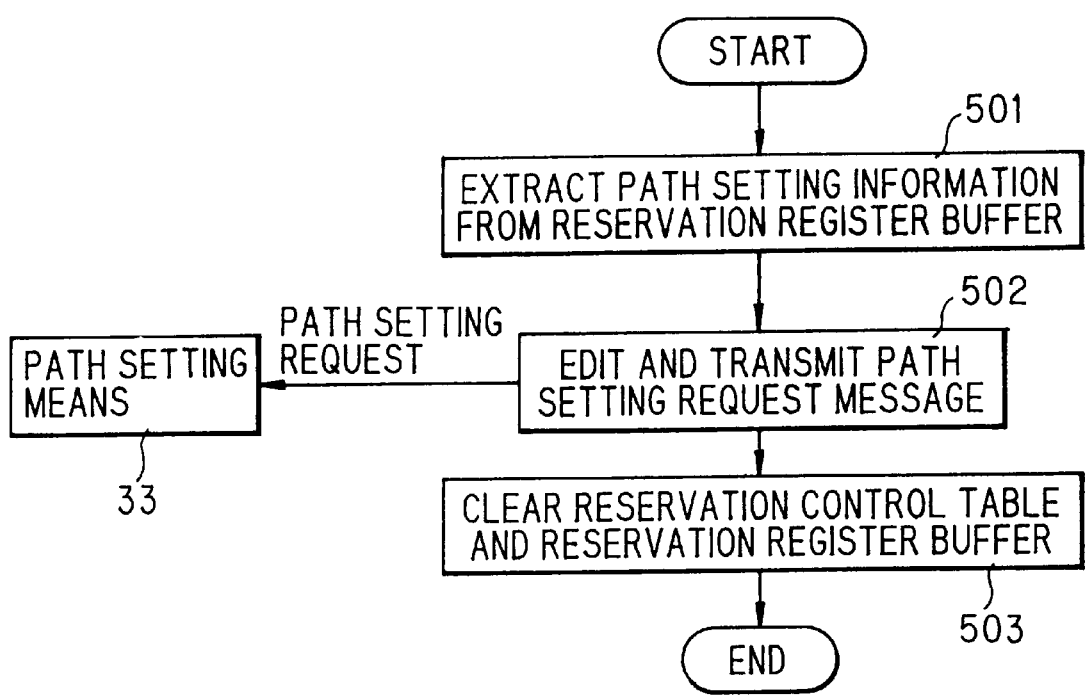
FIG. 18 is a flowchart of a reservation executing program.
Figure 19A:
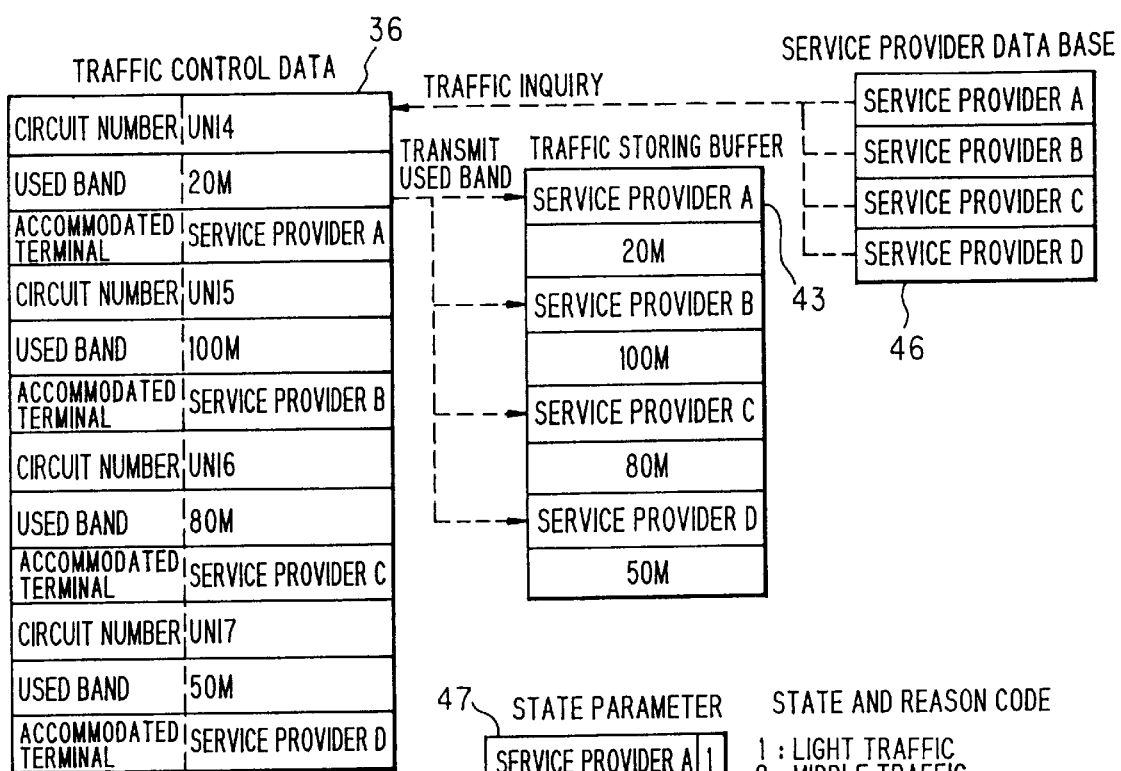
FIG. 19A shows examples of various data for explaining the process for creating a menu which reflects traffic.
Figure 19B:
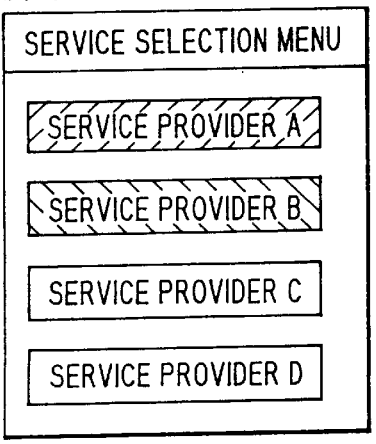
FIG. 19B shows an example of a service selection menu displayed after the process explained in FIG. 19A.

FIG. 12 is an entire flowchart of a navigation control process; FIG. 13 is a flowchart of a traffic extraction program 42; FIG. 14 is a flowchart of a traffic control program 35; FIG. 15 is a first flowchart of a menu optimization program 44; FIG. 16 is a second flowchart of a menu optimization program 44; FIG. 17 is a flowchart of a service execution program 45; and FIG. 18 is a flowchart of a reservation execution program 54. FIG. 19A shows examples of various data for explaining the process for creating a menu which reflects traffic, and FIG. 19B shows an example of a service selection menu displayed after the process explained in FIG. 19A.

In the following explanation, it is assumed that the traffic of a circuit accommodating a service provider is classified into heavy traffic, middle traffic, and light traffic, and that the three different colors are used so as to indicate the traffic in the respective service providers displayed in the service selection menu. When the traffic is, for example, when it is more than 100 megabits/sec (100M, hereinafter), it is regarded as heavy traffic; when it is 50 to 100M, it is regarded as middle traffic; and when it is less than 20M, it is regarded as light traffic. It is assumed that the traffic of the band used by the circuits UNI4 to UNI7 accommodating the service providers A to D are 20M, 100M, 80M, and 50M, respectively (see the traffic control data shown in FIG. 19A).

When a predetermined user terminal is connected to the navigation server 41, that is, when a predetermined user terminal accesses the navigation server 41, the traffic extraction program 42 starts in accordance with the flow shown in FIG. 12 (step 100). In the traffic extraction program 42, the numbers of the service providers A to D which are registered in the service provider data base 46 (see FIG. 19A) are first extracted (step 101). Since the service providers A, B, C, D are registered in the service provider data base 46, the number of the service provider A is first extracted. A traffic inquiry message containing the number of the service provider A is then edited and supplied to the network controller 31 so as to start the traffic control program 35 (step 102).

When the traffic inquiry message is received by the network controller 31, the processor 32a extracts the band used by the circuit UNI4 accommodating the service provider A from the traffic control data portion 36 in accordance with the traffic control program 35. A used band message is then edited and supplied to the navigation server 41 so as to start the traffic extraction program 42 (step 200). FIG. 14 is a flowchart of the traffic control program 35.

The traffic control program 35 is composed of two processes. In a first process, a request for connection or cut of a path is monitored (step 201), and when a request for connection or cut of a path is issued, the band used by the circuit UNI accommodating the service provider which is to be connected or cut is automatically changed (step 202). In a second process, the processor 32a extracts the band used by the circuit accommodating the service provider in response to the inquiry message in the traffic extraction program 42. More specifically, the processor 32a monitors the message from the signal terminator 34 (step 203) and starts the second process of the traffic control program 35 in response to the traffic inquiry request message. Since the traffic inquiry request message contains the number of the service provider A, the processor 32a searches the traffic control data portion 36 on the basis of the number of the service provider A (step 204), and edits and transmits an information message which contains the band used by the circuit accommodating the service provider (step 205).

When the navigation server 41 receives the used band information message (step 103 in FIG. 13), the processor 41b sets the band 20M used by the service provider A in the traffic storing buffer 43 in the traffic extraction program 42 (step 104). Judgement is then made as to whether or not the extractions of the bands used by all the service providers are finished (step 105), if the answer is NO, the above processing is repeated so as to extract the bands used by the other service providers B, C, D and the bands obtained are stored in the traffic storing buffer 43 (see FIG. 19A).

In this manner, when the bands used by all the service providers are obtained, the menu optimization program 44 is started (step 300 in FIG. 12). FIGS. 15 and 16 are flowcharts of the menu optimization program 44, and processing is executed thereafter in accordance with the program 44. The user terminals connected to the navigation server 41 can be connected to all the service providers A to D, and they are not assumed to be restricted due to congestion. The restriction value (restriction band) which is regarded as congestion is assumed to be 150M.

Whether or not a predetermined service provider is reserved is first judged with reference to the reservation control table 51 (steps 301, 302). If there is no reservation, the access information (subscription, access restriction) in the user information data base 49 is referred to (step 303) so as to judge whether or not the service provider is connectable (step 304). Since a user terminal can be connected to all the service providers, the congestion control table 48 is then referred to (step 305) so as to judge whether or not the service of the service provider is restricted (congestion) (step 306).

Since it is assumed here the service of no service provider is restricted, the band used by the circuit accommodating the service provider which is stored in the traffic storing buffer 43 is read (step 307), and the used band 20M is compared with the restriction value (restriction band) 150M (step 308). If the used band is less than the restriction band, the traffic (heavy/middle/light traffic) is judged on the basis of the used band and the state code (1: heavy traffic, 2: middle traffic, 3: light traffic) indicating the traffic is set at the position of the service provider in the menu buffer 47 (step 309, see FIG. 19B).

Judgement is then made as to whether or not the process is finished with respect to all the service providers (step 310), and if the answer is NO, the processing after step 301 is repeated with respect to another service provider.

If the state codes are set in the menu buffer 47 with respect to all the service providers (step 310), a service selection menu (FIG. 19B) which reflects the traffic (heavy/middle/light traffic) is created on the basis of the information stored in the menu buffer 47 (step 311), supplied to the user terminal and displayed on the display of the user terminal (step 312).

In this manner, the service selection menu can dynamically reflect the traffic.

In the above processing, if a predetermined service provider is selected while the service selection menu is displayed on the user terminal, the service execution program 45 is started (step 400 in FIG. 12). FIG. 17 is a flowchart of the service execution program 45. The processing is thereafter executed in accordance with the flow shown in FIG. 17.

Since there is no function of displaying the information of a service provider (step 401) and the user did not reserve the service provider (step 403), judgement is made as to whether or not the user terminal can be connected to the service provider (step 404). If the answer is in the affirmative, the information (phone number) necessary for the setting of a path between the user terminal and the service provider is extracted from the user information data base 49 and the service provider data base 46 (step 405), and a path setting request message is edited and transmitted to the path setting portion 33 (step 406). The path setting portion 33 delivers a call setting message to the ATM exchange 61 so as to connect the user terminal and the service provider.

Figure 20A:
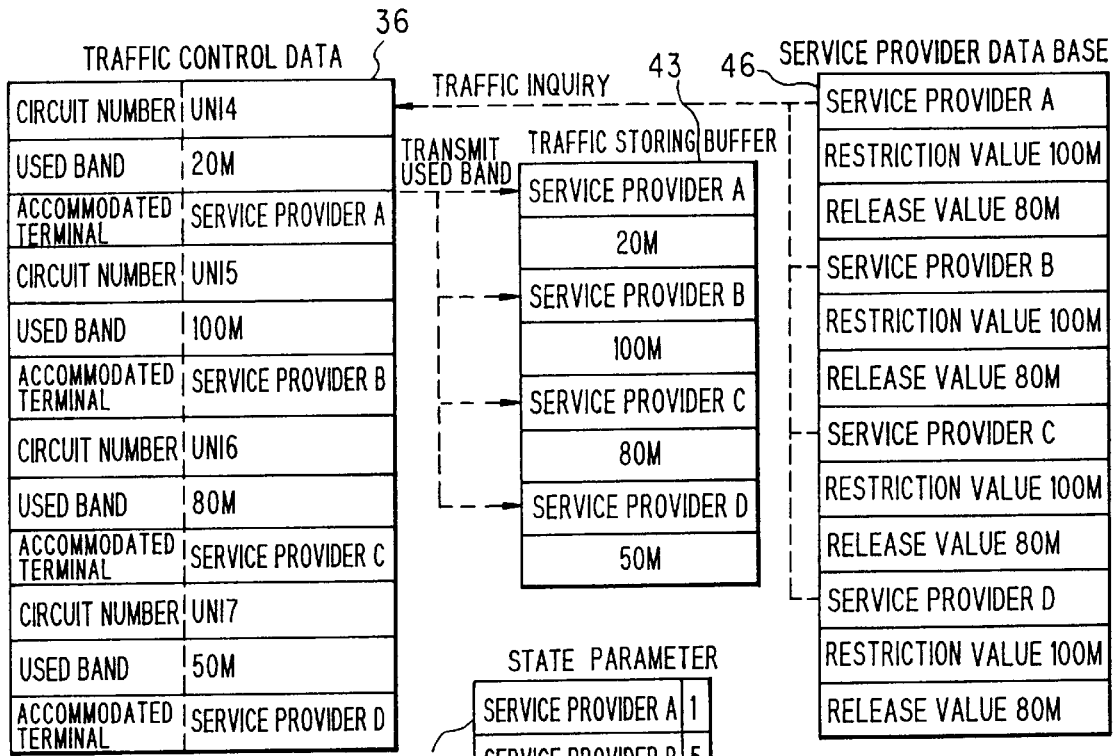
FIG. 20A shows examples of various data for explaining the process for restricting the access to a service provider and releasing the restriction.
Figure 20B:
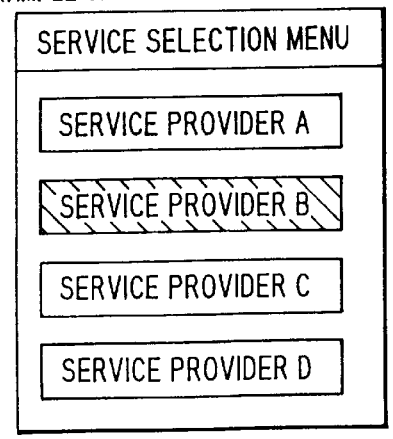
FIG. 20B shows an example of a service selection menu displayed after the process explained in FIG. 20A.

(d) Process for restricting the access to service provider and releasing restriction FIG. 20A shows examples of various data for explaining the process for restricting the access to a service provider and releasing the restriction, and FIG. 20B shows an example of a service selection menu displayed after the process explained in FIG. 20A. In the following explanation, it is assumed that a service selection menu displays a service provider the access to which is restricted with a different color so as to indicate that the selection of the service provider of that color is impossible. It is also assumed that the traffic of the circuits accommodating the service providers A to D, the restriction value which is regarded as congestion, and the release value which is regarded as the release of congestion are as shown in FIG. 20A.

When a predetermined user terminal is connected to the navigation server 41, the traffic extraction program 42 is started (step 100 in FIG. 12), and the band used by the circuit accommodating each service provider is stored in the traffic storing buffer 43. When the traffic extraction process is finished, the menu optimization program 44 is started (step 300 in FIG. 12), and the menu optimizing process is executed in accordance with the flowcharts shown in FIGS. 15 and 16.

Since there is no preservation for a predetermined service provider (steps 301, 302), the user terminal can be connected to the service provider (steps 303, 304), and the service of the service provider is not restricted due to congestion (step 306), the band used by the circuit accommodating the service provider is read (step 307) and the available band is compared with the restriction value (restriction band) which is regarded as congestion (step 308).

At this point of time, the band used by each of the circuits accommodating the service providers A, C, D, respectively, is less than the restriction values, but the band used by the circuit accommodating the service provider B is not less than the restriction value, as shown in FIG. 20A. Consequently, a restriction flag is set at the position corresponding to the service provider B in the congestion control data table 48 (step 321), and a restriction code (=5) is set in the state parameter field of the service provider B in the menu buffer 47 (step 309). State codes, 1, 2, 2 which indicate the respective traffic of the service providers A, C and D are set in the state parameter fields thereof in the menu buffer 47.

When the edition of the menu buffer 47 is finished with respect to all the service providers (step 310), a service selection menu which reflects the service restriction state is created with reference to the menu buffer 47 (step 311), and it is displayed on the display of the user terminal (step 312). The service provider B the service of which is restricted is then displayed in the service selection menu with a different color so as to be discriminated from the other service providers.

If a predetermined service provider, for example, the service provider B is selected from the service selection menu displayed on the user terminal, the service execution program 400 is started, and the process is executed in accordance with the flowchart shown in FIG. 17.

Since there is no function of displaying the information of a service provider (step 401), and the user has not reserved the service provider B (step 403), judgement is made as to whether or not the service is restricted (step 404). Since the service of the service provider B is restricted, the selection of the service provider B is annulled. That is, the user terminal is not connected to the service provider B.

If another user accesses the navigation server 41 at the point of time when the band used by the circuit UNI5 which accommodates the service provider B is reduced to less than 80 M, the traffic extraction program 42 is started (step 100, FIG. 12). When the traffic extraction process is finished in accordance with the traffic extraction program 42, the menu optimization program 44 is started (step 300), and the menu optimization process is executed in accordance with the flowchart shown in FIGS. 15 and 16.

Judgement is first made as to whether or not the service of a predetermined service provider is reserved (step 301). Since there is no reservation (steps 301, 302) and the user terminal can be connected to the service provider (step 304), whether or not there is a service provider which is restricted due to congestion is judged (step 306). Since the service provider B is restricted, the band used by the circuit accommodating the service provider B is compared with the restriction value registered in the service provider data base 46 (step 331). If the used band is less than the congestion release value (step 332), the restriction flag in the congestion control data 48 is removed (step 333). Thereafter, the processing after the step 308 is executed with respect to the predetermined service provider. In this manner the process for restricting the access to a service provider and releasing restriction is executed.

(e) Bypass process executed when service provider is congested

FIG. 21A shows examples of various data for explaining the bypass process executed when a service provider is congested, and FIG. 21B shows an example of a service selection menu displayed after the process explained in FIG. 21A.

The case of bypassing a service provider which is congested to another service provider will be explained. It is assumed that the restriction value (restriction band) which is regarded as congestion and the congestion release value (release band) for releasing the restriction are set in the service provider data base 46 and that the substitute addresses of all the service providers are set.

When a predetermined user terminal is connected to the navigation server 41, the traffic extraction program 42 is started (step 100 in FIG. 12), and the band used by the circuit accommodating each service provider is stored in the traffic storing buffer 43 (FIG. 21A). The menu optimization program 44 is then started (step 300 in FIG. 12) and the menu optimizing process is executed in accordance with the flowcharts shown in FIGS. 15 and 16.

Judgement is first made as to whether or not the service of a predetermined service provider is reserved (step 301). Since there is no reservation of the service provider (steps 301, 302), the user terminal can be connected to the service provider (step 304). In addition, since the service of the service provider is not restricted due to congestion (step 306), the traffic of the band used by the circuit accommodating the service provider is read (step 307), and the used band is compared with the restriction value (restriction band) which is regarded as congestion (step 308). At this point of time, the band used by each of the circuits accommodating the service providers A, C, D, respectively, is less than the restriction values, but the band used by the circuit accommodating the service provider B is not less than the restriction value. Consequently, judgement is made as to whether or not the address of a substitute service provider of the service provider B is set with reference to the service provider data base 46 (step 341).

Since the address of the substitute service provider of the service provider B is set, a bypass command code is set in the bypass parameter field of the predetermined service provider (step 342, see FIG. 21A). The processing after the step 309 is executed so as to set the state code of each service provider in the menu buffer 47, and a service selection menu is created on the basis of the contents of the menu buffer 47 and displayed on the display of the user terminal (FIG. 21B). What is noticeable here is that when the address of a substitute service provider of a service provider is set, even if the circuit accommodating the service provider is congested, the service of the service provider is not considered as restricted but displayed as a selectable service provider in the service selection menu.

According to this processing, when a predetermined service provider, e.g., the service provider B is selected from the service selection menu displayed on the display of the user terminal, the service execution program 45 is started (step 400 in FIG. 12), and the process is executed in accordance with the flowchart shown in FIG. 17.

Since it is assumed in the process shown in FIG. 17 that there is no function of displaying the information of a service provider (step 401), and the user did not reserve the service provider (step 403), judgement is made as to whether or not the service of the service provider is restricted and whether or not a bypass command is issued (step 404). If a bypass command code is set, the pass set information (e.g., phone number) of the substitute service provider is extracted from the service provider data base 46 (step 407), and a path setting request message for requesting a path to be set between the user terminal and the substitute service provider is edited and transmitted to the path setting portion 33 (step 406). The path setting portion 33 delivers a call setting message to the ATM exchange 61 so as to connect the user terminal and the service provider. In this manner, a bypass process is executed when a service provider is congested.

(f) Process for creating optimum menu for user

FIG. 22A shows examples of various data for explaining the process for creating an optimum menu, and FIG. 22B shows an example of a service selection menu displayed after the process shown in FIG. 22A. In the following explanation, it is assumed that a service selection menu is optimized for a user.

It is assumed that the information shown in FIG. 22A is registered in advance in the user information data base 49 and the service provider data base 46 and that the bands used by the circuits accommodating the service providers A to D are 20M, 100M, 140M, and 50M, respectively. It is understood with reference to the user information data base 49 that (1) the maximum band used by the user terminal A is 20M, (2) although the user terminal A can receive the service from the service providers B and C under contract (subscription), it cannot receive the service from the service provider A because it has not subscribed thereto, and (3) the user terminal A cannot receive the service from the service provider D because the service provider D is specified in the access restriction field. It is also understood with reference to the service provider data base 46 that the band necessary for the offer of the service from the service providers A to D is 20M and that the physical band of the circuit accommodating each service provider is 150M.

When a predetermined user terminal (here, the user terminal A) is connected to the navigation server 41, the traffic extraction program 42 is started (step 100 in FIG. 12), and the band used by the circuit accommodating each service provider is stored in the traffic storing buffer 43 under the control of the traffic extraction program 42 (FIG. 22A). The menu optimization program 44 is started (step 300 in FIG. 12), and the menu optimizing process is executed in accordance with the flowcharts shown in FIGS. 15 and 16.

Whether or not a predetermined service provider is reserved is first judged (step 301). Since there is no reservation of the service provider (step 302), the service providers entered in the subscription field and the access restriction field are retrieved from the user information data base 49 by using the user ID supplied from the user terminal A at the time of connection (step 303). Judgment is then made as to whether or not the user terminal A can be connected to the predetermined service provider (step 304). Since the user terminal A has not subscribed to the service provider A, it is impossible to connect the user terminal A to the service provider A (step 304). For this reason, the reason code (=7) indicating no subscription is set into the state parameter field of the service provider A in the menu buffer 47 (step 351, see FIG. 22A).

Judgement is then made as to whether or not the state code has been written in the menu buffer 47 with respect to all the service providers (step 310). If the answer is in the negative, the predetermined service provider is changed, and the processing after the step 301 is repeated. Since the service provider D is written in the access restriction field in the user terminal data base 49 and it is not connectable, the reason code (=6) which indicates the rejection of connection is set in the state parameter field of service provider D in the menu buffer 47 (step 351).

The access restriction is service set by a user or a controller of the navigation server so as to inhibit the access to a service provider which does not restrict an object of access.

Since the service providers B, C are subscribed to by the user terminal A and they are not in the access restriction field, they are connectable (step 304). Whether or not the service providers B, C are restricted due to congestion is then judged (step 306), and if the answer is NO, the bands used by the circuits accommodating the service providers B, C which are stored in the traffic storing buffer 43 are read (step 307), and the used bands are compared with the respective restriction values (restriction bands) which are regarded as congestion (step 308).

If the used band is less than the restriction band, the traffic is judged on the basis of the used band, and the state code indicating the traffic (heavy traffic/middle traffic/light traffic) is set at the position of the service provider in the menu buffer 47. More specifically, the available band (=physical band−used band) of the circuit accommodating the service provider B or C is compared with the maximum available band of the user terminal A. Since the available band of the service provider C is 10M and the band necessary for the user terminal A is 20M, the band is insufficient. Therefore, the reason code (=4) indicating impossibility of the capture of the resource is written in the state parameter of the service provider C in the menu buffer 47. On the other hand, since the available band of the service provider B is 50M and the band necessary for the user terminal A is not less than 20M, the traffic (heavy/middle/light) is judged on the basis of the used band 100M, and the state code (=3) indicating heavy traffic is written in the state parameter field (step 309, see FIG. 22A).

In the above process, the maximum available band of the user terminal is taken into consideration as the performance of the user terminal and the service provider. Other performance such as the decoding system of the user terminal and the encoding system of the service provider may be taken into consideration. For example, if the decoding system of the user terminal does not match the encoding system of a service provider, in other words, if the encoded data supplied from the service provider cannot be decoded by the user terminal, it is judged that the user terminal cannot be connected to the service provider, and the reason code indicating, for example, impossibility of decoding is written in the state parameter field of the menu buffer 47.

Thereafter, judgement is made as to whether or not the processing is finished with respect to all the service providers (step 310), if the answer is in the negative, the processing after the step 301 is repeated with respect to another service provider. When the setting of the menu buffer 47 is finished with respect to all the service providers (step 310), a service selection menu (FIG. 22B) reflecting the possibility of connection and the traffic (heavy/middle/light) is created on the basis of the information stored in the menu buffer 47 (step 311), and the service selection menu is transmitted to the user terminal A so as to be displayed on the display of the user terminal A (step 312). In this manner, it is possible to create a service selection menu which reflects the traffic of a selectable service provider in consideration of the possibility of connection and the traffic (heavy/middle/light) and to display the service selection menu.

If a predetermined service provider, for example, the service provider B is selected from the service selection menu displayed on the user terminal A as a result of the above processing, the service execution program 45 is started and executed in accordance with the flowchart shown in FIG. 17.

Since it is assumed in the process shown in FIG. 17 that there is no function of displaying the information of a service provider (step 401) and the user did not reserve the service provider B (step 403), judgement is made as to whether or not the user terminal A can be connected to the service provider B with reference to the state code of the service provider B stored in the menu buffer 47 (step 404). If the answer is in the affirmative, the information (phone number) necessary for the setting of a path between the user terminal A and the service provider B is extracted from the user information data base 49 and the service provider data base 46 (step 405), and a path setting request message is edited and transmitted to the path setting portion 33 (step 406). The path setting portion 33 delivers a call setting message to the ATM exchange 61 so as to connect the user terminal A and the service provider B.

(g) Display information on service provider in menu

FIG. 23 shows examples of various data set for explaining the process for displaying the information on a service provider and the reason for the impossibility of connection; and FIG. 24 shows an example of a displayed service selection menu and explains a reason text table. In the following explanation, it is assumed that connectable service providers and service providers which can not be connected are displayed with different colors so as to facilitate discrimination, that the information on a selected service provider is displayed and that the message conveying the reason for the impossibility of connection is also displayed.

It is assumed that the information shown in FIG. 23 is registered in advance in the user information data base 49 and the service provider data base 46 and that the bands used by the circuits accommodating the service providers A to D are 20M, 100M, 140M, and 50M, respectively. It is understood with reference to the user information data base 49 that (1) the maximum band used by the user terminal A is 20M, (2) although the user terminal A can receive the service from the service providers B and C under contract, it cannot receive the service from the service provider A because it has not subscribed thereto, and (3) the user terminal A cannot receive the service from the service provider D because the service provider D is specified in the access restriction field.

Information is displayed for each of the service providers A to D in the service provider data base 46, and it is also understood that the band necessary for the offer of the service from the service providers A to D is 20M and that the physical band of the circuit accommodating each service provider is 150M.

When a predetermined user terminal (here, the user terminal A) is connected to the navigation server 41, the traffic extraction program 42 is started (step 100 in FIG. 12), and the band used by the circuit accommodating each service provider is stored in the traffic storing buffer 43 under the control of the traffic extraction program 42 (FIG. 23). The menu optimization program 44 is started (step 300 in FIG. 12), and the menu optimizing process is executed in accordance with the flowcharts shown in FIGS. 15 and 16.

Whether or not a predetermined service provider is reserved is first judged (step 301). Since there is no reservation of the service provider (step 302), the service providers entered in the subscription field and the access restriction field are retrieved from the user information data base 49 by using the user ID supplied from the user terminal A at the time of connection (step 303). Judgment is then made as to whether or not the user terminal A can be connected to the predetermined service provider (step 304). Since the user terminal A has not subscribed to the service provider A, it is impossible to connect the user terminal A to the service provider A (step 304). For this reason, the reason code (=7) which indicates that the service provider A has not been subscribed is set into the state parameter field of the service provider A in the menu buffer 47 (step 351, see FIG. 23).

Judgement is then made as to whether or not the state code (reason code) has been written in the menu. buffer 47 with respect to all the service providers (step 310). If the answer is in the negative, the predetermined service provider is changed, and the processing after the step 301 is repeated. Since the service provider D is written in the access restriction field in the user terminal data base 49 and it is not connectable, the reason code (=6) which indicates the rejection of connection is set in the state parameter field of service provider D in the menu buffer 47 (step 351).

Since the service providers B, C are subscribed to by the user terminal A and they are not in the access restriction field, they are connectable (step 304). Whether or not the service providers B, C are restricted due to congestion is then judged (step 306), and if the answer is NO, the bands used by the circuits accommodating the service providers B, C which are stored in the traffic storing buffer 43 are read (step 307), and the used bands are compared with the respective restriction values (restriction bands) which are regarded as congestion (step 308). If the used band is less than the restriction band, the traffic is judged on the basis of the used band, and the state code indicating the traffic (heavy traffic/middle traffic/light traffic) is set at the position of the service provider in the menu buffer 47. More specifically, the available band (=physical band−used band) of the circuit accommodating the service provider B or C is compared with the maximum available band of the user terminal A. Since the available band of the service provider C is 10M and the band necessary for the user terminal A is 20M, the band is insufficient. Therefore, the reason code (=4) indicating impossibility of the capture of the resource is written in the state parameter field of the service provider C in the menu buffer 47. On the other hand, since the available band of the service provider B is 50M and the band necessary for the user terminal A is not less than 20M, the traffic (heavy/middle/light) is judged on the basis of the used band 100M, and the state code (=3) indicating heavy traffic is written in the state parameter field (step 309, see FIG. 23).

Thereafter, judgement is made as to whether or not the processing is finished with respect to all the service providers (step 310), and if the answer is in the negative, the processing after the step 301 is repeated with respect to another service provider. When the setting of the menu buffer 47 is finished with respect to all the service providers (step 310), a service selection menu reflecting the possibility of connection and the traffic (heavy/middle/light) is created on the basis of the information stored in the menu buffer 47 (step 311), and the service selection menu is transmitted to the user terminal so as to be displayed on the display thereof (step 312). In this manner, it is possible to create a service selection menu which displays selectable service providers and service providers which cannot be connected with different colors so as to facilitate discrimination in consideration of the possibility of connection and the traffic (heavy/middle/light) and to display the service selection menu on the display of the user terminal (FIG. 24).

If a predetermined service provider, for example, the service provider A is selected from the service selection menu displayed on the user terminal as a result of the above processing, the service execution program 45 is started (step 400 in FIG. 12) and executed in accordance with the flowchart shown in FIG. 17.

Since there is a function of displaying the information on a service provider (step 401), the display information of the service provider A is read from the service provider data base 46 and displayed in the information display area of the menu (see FIG. 24). Since the user terminal A has not subscribed to the service provider A, it is impossible to connect the user terminal A to the service provider A. The message conveying the reason for the impossibility of connection is retrieved from the reason text table 50 with the reason code (=7) as an index, and the message is displayed in the menu (step 461).

Since the user did not reserve the service provider A (step 403), judgement is made as to whether or not the user terminal A can be connected to the service provider A with reference to the information of the service provider A stored in the menu buffer 47 (step 404). Since it is impossible to connect the user terminal A to the service provider A because it has not subscribed thereto, the selection of the service provider A is annulled and the user terminal A is not connected to the service provider A.

On the other hand, if a predetermined service provider, for example, the service provider B is selected from the menu displayed on the user terminal A, the service execution program 45 is started. Since there is a function of displaying the information of a service provider (step 401), the display information of the service provider B is read from the service provider data base 46 and displayed in the information display area of the menu (step 461).

Since the user did not reserve the service provider B (step 403), judgement is made as to whether or not the user terminal A can be connected to the service provider B with reference to the state code of the service provider B stored in the menu buffer 47 (step 404). Since the answer is in the affirmative, the information (phone number) necessary for the setting of a path between the user terminal A and the service provider B is extracted from the user information data base 59 and the service provider data base 46 (step 405), and a path setting request message is edited and transmitted to the path setting portion 33 (step 406). The path setting portion 33 delivers a call setting message to the ATM exchange 61 so as to connect the user terminal A and the service provider B. The program may be so constituted as to display the information on a service provider at a first service provider selection, and to execute the processing after the step 403 at a second service provider selection.

(h) Process for displaying menu which reflects service quality level

FIG. 25A shows examples of various data for explaining the process for displaying a menu which reflects the service quality level; and FIG. 25B shows an example of a service selection menu displayed after the process explained in FIG. 25A. In the following explanation, it is assumed that the quality level of the service provided is classified into high-quality level, middle-quality level and low-quality level and that only a connectable service provider and the level thereof are displayed.

It is assumed that the information shown in FIG. 25A is registered in advance in the user information data base 49 and the service provider data base 46 and that the bands used by the circuits accommodating the service providers A to D are 20M, 100M, 140M, and 50M, respectively.

It is understood with reference to the user information data base 49 that (1) the maximum band used by the user terminal A is 20M, (2) although the user terminal A can receive the service from the service providers B and C under contract, it cannot receive the service from the service provider A because it has not subscribed thereto, and (3) the user terminal A cannot receive the service from the service provider D because the service provider D is specified in the access restriction field.

It is also understood with reference to the service provider data base 46 that the physical band of the circuit accommodating each of the service providers A to D is 150M, and that the bands necessary for the offer of the service at high-quality level, middle-quality level and low-quality level are 30M, 20M and 10M, respectively.

When the user terminal A is connected to the navigation server 41, the traffic extraction program 42 is started (step 100 in FIG. 12), and the band used by the circuit accommodating each service provider is stored in the traffic storing buffer 43 (FIG. 25A). The menu optimization program 44 is then started (step 300) and the menu optimizing process is executed in accordance with the flowcharts shown in FIGS. 15 and 16.

Judgement is first made as to whether or not the service of a predetermined service provider, e.g., A is reserved (step 301). Since there is no reservation of the service provider A (step 302), the service providers entered in the subscription field and the access restriction field are retrieved from the user information data base 49 by using the user ID supplied from the user terminal A at the time of connection (step 303). Judgement is the made as to whether or not the user terminal A can be connected to the service provider A (step 304). Since the user terminal A has not subscribed to the service provider A, it is impossible to connect the user terminal A to the service provider A. For this reason, the reason code (=7) which indicates that the service provider A has not been subscribed to is set into the state parameter field of the service provider A (step 351, see FIG. 25).

Judgement is then made as to whether or not the state code has been written in the menu buffer 47 with respect to all the service providers (step 310). If the answer is in the negative, the predetermined service provider is changed, and the processing after the step 301 is repeated. Since the service provider D is written in the access restriction field in the user terminal data base 49 and it is not connectable, the reason code (=6) which indicates the rejection of connection is set in the state parameter field of service provider D in the menu buffer 47 (step 351).

Since the service providers B, C are subscribed to by the user terminal A and they are not in the access restriction field, they are connectable (step 304). Whether or not the service providers B, C are restricted due to congestion is then judged (step 306), and if the answer is NO, the bands used by the circuits accommodating the service providers B, C which are stored in the traffic storing buffer 43 are read (step 307), and the used bands are compared with the respective restriction values (restriction bands) which are regarded as congestion (step 308). If the used band is less than the restriction band, the following quality parameter setting process is executed at the step 309.

FIG. 26 is a flowchart of a quality parameter setting process.

The bands (=physical band−used band) used by the circuit accommodating the service providers B, C are calculated (step 309a). The available band of the service provider B is 50M and the available band of the service provider C is 10M. The available band 50M of the service provider B is compared with each of the bands 30M, 20M and 10M necessary for the offer of the service at high-quality level, middle-quality level and low-quality level, respectively (step 309b), and a quality level at which the service is possible because the band necessary for the service is less than 50M is stored (step 309c). It is understood that since any of the bands 30M, 20M and 10M necessary for the offer of high-quality service, middle-quality service and low-quality service, respectively is less than the available band 50M, the service is possible at any quality level.

Then, the maximum available band of the user terminal A is obtained from the user information data base 49, the maximum available band (=20M) obtained is compared with the bands 30M, 20M and 10M necessary for the offer of the service at the respective qualities which are stored at the step 309c (309d), and the quality level which necessitates the band less than the maximum available band 20M is written in the quality parameter field in the menu buffer 47 as connectable (309e). To state this concretely, since the band 30M necessary for the offer of the service from the service provider B at a high-quality level is larger than the maximum available band 20M of the user terminal A, it is impossible to provide the user terminal A with high-quality service, and the connectable quality levels are a middle quality level and a low quality level. When the connectable quality levels are known, the fact that the service is possible at a middle-quality level or a low-quality level is written in the quality parameter field of the service provider B in the menu buffer 47 (see FIG. 25). Whether or not the process is finished with respect to all the quality levels stored at the step 309c is judged (step 309f), and if the answer is NO, the processing after the step 309 is repeated with respect to another quality level.

When the writing of the data on the possibility of connection at each quality level into the menu buffer 47 is finished, the traffic of the used band of the service provider B is judged and the state code indicating the traffic is set in the state parameter field of the menu buffer 47 (step 309g). Since the used band of the service provider B is 100M, the state code (=3) indicating heavy traffic is set in the menu buffer 47.

Judgement is then made as to whether or not the process is finished with respect to all the service providers (step 310, FIG. 16). If the answer is in the negative, the predetermined service provider is changed, and the processing after the step 301 is repeated. Accordingly, the quality parameter setting process is also executed with respect to the service provider C. In the case of the service provider C, since the available band is 10M, the service is possible only at a low-quality level. Therefore, the fact that the service is possible only at a low-quality level and that high/middle quality is impossible is written in the quality parameter field of the service provider C in the menu buffer 47 (see FIG. 25). Similarly, the traffic of the used band (140M) of the service provider C is judged and the state code (=3) indicating heavy traffic is set in the state parameter field of the menu buffer 47.

When the setting in the menu buffer 47 is finished with respect to all the service providers, a service selection menu (see FIG. 25B) is created in accordance with the information stored in the menu buffer 47 (step 311), transmitted to the user terminal A and displayed on the display of the user terminal A (step 312). That is, only connectable service providers and quality levels are displayed in the service selection menu in consideration of the possibility of connection for each quality level of a service provider.

If a predetermined service provider and quality level is selected from the service selection menu displayed on the user terminal A as a result of the above processing, the service execution program 45 is started (step 400 in FIG. 12) and executed in accordance with the flowchart shown in FIG. 17.

Since there is no function of displaying the information on a service provider (step 401) and the user did not reserve the service provider (step 403), judgement is made as to whether or not the user terminal A can be connected to the service provider at the selected quality level (step 404). If the answer is in the affirmative, the information (phone number) necessary for the setting of a path between the user terminal A and the service provider is extracted from the user information data base 49 and the service provider data base 46 (step 405), and a path setting request message is edited and transmitted to the path setting portion 33 (step 406). The path setting portion 33 delivers a call setting message to the ATM exchange 61 so as to connect the user terminal A and the service provider. If the connection is impossible, the selection of the service provider and the quality level is annulled, and the user terminal A is not connected to the service provider. In this manner, it is possible to display a service selection menu which reflects the serviceable quality level and to select a service provider from the menu.

(i) Reservation process for service provider which is congested;

FIG. 27 shows examples of various data set for explaining the reservation process for a service provider which is congested; and FIG. 28 is an explanatory view of a service selection menu which enables reservation and a reservation control data table.

In the following explanation, it is assumed that (1) a reservation button (reservation field) is added in correspondence with the service provider which is not connectable (whose service is impossible) due to congestion, (2) the service of the service provider is reserved by selecting the reservation button, and (3) the user terminal which reserved the service provider is automatically connected to the service provider when the traffic is reduced so as to receive the service. It is also assumed that (1) the bands used by the circuits accommodating the service providers A to D are 20M, 100M, 80M, and 50M, respectively, (2) the restriction value which is regarded as congestion is 100M and the congestion release value which is regarded as the release of congestion is 80M, and (3) the user terminal A is connectable to every service provider under contract, as shown in FIG. 27.

When the user terminal A is connected to the navigation server 41, the traffic extraction program 42 is started (step 100 in FIG. 12), and the band used by the circuit accommodating each service provider is stored in the traffic storing buffer 43. The menu optimization program 44 is then started (step 300 in FIG. 12) and the menu optimizing process is executed in accordance with the flowcharts shown in FIGS. 15 and 16.

Since there is no reservation for a predetermined service provider (steps 301, 302), the user terminal can be connected to the service provider (steps 303, 304), and the service of the service provider is not restricted due to congestion (step 306). Therefore, the band used by the circuit accommodating the service provider is read after the processing at the step 306 (step 307) and the available band is compared with the restriction value (restriction band) which is regarded as congestion (step 308). At this point of time, the band used by each of the circuits accommodating the service providers A, C, D, respectively, is less than the restriction values, but the band used by the circuit accommodating the service provider B is not less than the restriction values. Consequently, a restriction flag is set at the position corresponding to the service provider B in the congestion control data table 48 (step 321, see FIG. 27), and a restriction code (=5) is set in the state parameter field of the service provider B in the menu buffer 47 (step 309). State codes which indicate the traffic of the service providers A, C and D are set in the state parameter fields thereof in the menu buffer 47.

When the edition of the menu buffer 47 is finished with respect to all the service providers, (step 310), a service selection menu which reflects the service restriction state is created with reference to the menu buffer 47 (step 311). Whether or not there is a reservation function is judged (step 355). Since the answer is YES, a reservation button is added to the service provider B which is restricted in the service selection menu (step 352). Thereafter, the service selection menu is transmitted to the user terminal A so as to be displayed on the display, as shown in FIG. 28 (step 312). The service provider B which is restricted is displayed so as to be distinguishable from the other service providers A, C and D by, for example, using a different color. And a reservation button RBT is provided in parallel with the name of the service provider B which is restricted.

If the reservation button RBT is selected so as to reserve the service provider B which is restricted, the service execution program 45 is started and the process shown in FIG. 17 is executed.

If there is no function of displaying the information on a service provider, judgement is immediately made as to whether or not the user has reserved the service provider B (step 403). Since the answer is in the affirmative, the user terminal A and the reserved service provider B are set in the reservation register buffer 52 in correspondence with each other (FIG. 27), and a reservation flag is set at the position corresponding to the service provider B in the reservation control data table 51 (step 471, see FIT. 28). In this manner, the reservation process is finished.

After the reservation, when the circuit UNI5 accommodating the service provider B is reduced to less than 80M, another user terminal, for example, the user terminal B accesses the navigation server 41. The traffic extraction program 42 is then started and after the end of the extraction of the traffic in accordance with the traffic extraction program 42, the menu optimization program 44 is started so as to execute the processes shown in FIGS. 15 and 16.

Whether or not there is reservation is first judged with reference to the reservation control table 51 (step 301). Since the service provider B is reserved, whether or not there is enough capacity for the service is judged with reference to the band used by the circuit accommodating the service provider B. In other words, whether or not the user terminal B can be connected to the service provider B is judged (step 353). To state this concretely, the user ID of the user terminal A which has reserved the service provider B is retrieved from the reservation register buffer B with the service provider number B as an index. The maximum available band of the user terminal A is then extracted from the user information data base 49, and the maximum available band is compared with the band used by the circuit accommodating the service provider B and the band necessary for the offer of the service so as to judge whether or not the connection is possible.

If the answer is in the negative, the process returns to the step 303, and the menu optimizing process is executed with respect to the user terminal B. On the other hand, if the answer is in the affirmative, the reservation execution program 54 is started (step 354) and the process shown in FIG. 18 is executed. In the reservation execution program 54, the user terminal which has reserved and the service provider reserved by the user terminal are obtained from the reservation register buffer 52. The path setting information (phone number of the like) of the user terminal and the service provider is then extracted from the user information data base 49 and the service provider data base 46 (step 501), and a path setting request message is edited and transmitted to the path setting portion 33 (step 502). Finally, the corresponding information is eliminated from the reservation control data table 51 and the reservation register buffer 52 (step 503). In this manner, the reservation of a service provider which is congested and the offer of a service after the congestion is released are enabled.

(j) Reservation process corresponding to service quality level

FIG. 29 shows examples of various data set for explaining the reservation process which corresponds to a service quality level; and FIG. 30 is an explanatory view of a service selection menu which enables reservation for each quality level.

In the following explanation it is assumed that a reservation button is displayed in a service selection menu for each quality level, and that a user reserves the service from a service provider at a predetermined quality level.

A similar process to the process (h) for displaying a menu which reflects a service quality level is executed, and the code (=7) indicating no subscription is set into the state parameter field of the service provider A in the menu buffer 47 while the code (=6) which indicates the rejection of connection is set in the state parameter field of service provider D in the menu buffer 47.

With respect to the accessible service providers B, C, the possibility of the service at each quality level is written in the menu buffer 47 by the quality parameter setting process shown in FIG. 26. More specifically, the data indicating that the service is possible at a middle-quality level or a low-quality level is written in the quality parameter field of the service provider B in the menu buffer 47, and the data indicating that the service is possible at a low-quality level is written in the quality parameter field of the service provider C in the menu buffer 47.

When the writing of the data on the possibility of connection at each quality level into the menu buffer 47 is finished, the traffic of the used bands of the service providers B, C is judged and the state code indicating the traffic (the state code =3 indicating heavy traffic) is set in the menu buffer 47.

When the edition of the menu buffer 47 is finished with respect to all the service providers (step 310), a service selection menu which enables discrimination between a quality level at which the service is possible and a quality level at which the service is impossible for each of the connectable service providers B, C is created with reference to the menu buffer 47 (step 311). Whether or not there is a reservation function is then judged (step 355). Since the answer is YES, a reservation button is added to the service provider B which is restricted in the service selection menu (step 352). Thereafter, the service selection menu is transmitted to the user terminal A so as to be displayed on the display, as shown in FIG. 30 (step 312). The names of the connectable service providers and their quality levels are displayed in the service selection menu so as to be distinguishable. And a reservation button RBT is provided in parallel with the quality level at which the service is impossible.

If the reservation button RBT is selected so as to reserve, for example, the high-quality service of the service provider B, the service execution program 45 is started and the process shown in FIG. 17 is executed. If there is no function of displaying the information on a service provider (step 401), judgement is immediately made as to whether or not the user has reserved the service provider B (step 403). Since the answer is in the affirmative, the user terminal A and the reserved service provider B and quality level are set in the reservation register buffer 52 in correspondence with each other, and a reservation flag is set at the position corresponding to the service provider B in the reservation control data table 51 (step 471, see FIT. 29). In this manner, reservation is finished.

After the reservation, when the circuit UNI5 accommodating the service provider B is so reduced as to enable the offer of the service at the reserved quality level, another user terminal, for example, the user terminal B accesses the navigation server 41. The traffic extraction program 42 is then started and after the end of the extraction of the traffic in accordance with the traffic extraction program 42, the menu optimization program 44 is started so as to execute the processes shown in FIGS. 15 and 16.

Whether or not there is reservation to a predetermined service provider is first judged with reference to the reservation control table 51 (step 301). Since the service provider B is reserved, whether or not there is enough capacity for the service is judged with reference to the band used by the circuit accommodating the service provider B. In other words, whether or not the user terminal B can be connected to the service provider B is judged (step 353). If the answer is in the negative, the process returns to the step 303, and the menu optimizing process is executed with respect to the user terminal B. On the other hand, if the answer is in the affirmative, the reservation execution program 54 is started (step 354) and the process shown in FIG. 18 is executed. In the reservation execution program 54, the user terminal which has reserved and the service provider reserved by the user terminal are obtained from the reservation register buffer 52. The path setting information (phone number of the like) of the user terminal and the service provider is then extracted from the user information data base 49 and the service provider data base 46 (step 501), and a path setting request message is edited and transmitted to the path setting portion 33 (step 502). Finally, the corresponding information is eliminated from the reservation control data table 51 and the reservation register buffer 52 (step 503). In this manner, it is possible to designate the quality level when a service provider is reserved.

In addition to the navigation process explained above, it is possible to appropriately combine the processes (c) to (j), as occasion demands.

As explained above, according to the present invention, it is possible to provide a high-quality service selection menu to a user by linking a network controller for connecting a network and executing traffic control with a navigation server.

It is possible to provide a user with a service selection menu which dynamically reflects the traffic (heavy, middle, light) of a circuit so as to make the user avoid selecting the service provider which is so much congested that the degeneration of the service quality is apprehended, thereby dispersing traffic.

It is also possible to secure the service quality of a service provider by restricting the access to the service provider when traffic congestion is continual in the circuit accommodating the service provider.

According to the present invention, it is possible to bypass a service provider when the circuit accommodating the service provider is congested, to another service provider having the same function and enough capacity.

In addition, it is possible to provide a service selection menu which does not include a service provider that cannot be connected because the user has not made a contract or the user rejects the connection of his/her own will, or due to the performance of the user terminal, thereby enabling the user to efficiently select a service provider.

According to the present invention, it is possible to display the reason why a service provider cannot be connected when such a service provider is selected.

Furthermore it is possible to display the information on the service provider designated by a user which is helpful to the user when the service provider is selected.

It is also possible to provide a user with a service selection menu which reflects the result of the judgment as to whether or not each of the service providers is connectable on the basis of the quality level of the service to be provided by each service provider which is classified into a plurality of quality levels, so as to enable the user to receive a service at a predetermined quality level.

It is further possible to reserve a service provider which cannot be connected due to a shortage of available band accommodating the service provider, and to automatically connect the terminal to the reserved service provider when the problem is solved so as to receive the service without fail.

According to the present invention, it is possible to classify the services provided by service providers into a plurality of quality levels, to reserve a service provider at a predetermined quality level which cannot be connected due to a shortage of available band of the circuit accommodating the service provider, and to connect the user terminal to the reserved service provider when the problem is solved so that the user can receive the service at the reserved quality level.

As many apparently widely different embodiments of the present invention can be made without departing from the spirit and scope thereof, it is to be understood that the invention is not limited to the specific embodiments thereof except as defined in the appended claims.

What is claimed is:

1. A navigation apparatus comprising:
    a traffic obtainer for obtaining band used by each circuit which accommodates a service provider respectively;
    a traffic storage buffer for storing said band obtained by said traffic obtainer;
    a menu optimizer for judging whether or not connection to each service provider is restricted on the basis of said band used by each circuit accommodating said service provider, creating a service selection menu which reflects the result of said judgement and displaying said service selection menu on a user terminal;
    a service executor for monitoring an operation of said user with respect to said service selection menu and executing predetermined control which corresponds to said operation;
    a service provider data base for storing information as to each service provider; and
    a menu buffer for storing data which shows whether or not the service of each service provider is restricted on the basis of the traffic of each circuit accommodating said service provider, in correspondence with said service provider;
    wherein said traffic obtainer obtains said band used by each circuit accommodating each service provider which is registered in said service provider data base and stores said band in said traffic storage buffer;
    said menu optimizer compares said band used by each circuit accommodating each service provider which is stored in said traffic storage buffer with restriction band of each service provider which is registered in advance in said service provider data base, stores 'restricted service' into said menu buffer in correspondence with said service provider when said band used by said circuit of said service provider is larger than said restriction band, and creates said service selection menu so as to enable said user to discriminate whether or not the service is restricted with respect to each service provider; and
    said service executor refers to said menu buffer when said user terminal selects a predetermined service provider, and annuls the selection if the service of said predetermined service provider is restricted, while requesting a path setter to set a path between said user terminal and said predetermined service provider if the service thereof is not restricted.

2. A navigation apparatus according to claim 4, further comprising:
    a congestion control table for storing congestion of said each circuit accommodating each service provider;
    wherein said menu optimizer compares said band used by said each circuit accommodating each service provider with said restriction band which is registered in advance in said service provider data base, sets data which shows 'congestion' in said congestion control table in correspondence with said service provider when said band used by said circuit of said service provider is larger than said restriction band, thereafter compares the band used by said circuit accommodating said service provider which is set at 'congestion' in said congestion control table with a congestion release band which is registered in advance in said service provider data base, releases said 'congestion' stored in said congestion control table if said band used by said circuit accommodating said service provider is smaller than said congestion release band, and releases 'restriction service' stored in said menu buffer.

3. A navigation apparatus according to claim 1, wherein said menu optimizer compares said band used by said each circuit accommodating each service provider which is stored in said traffic storage buffer with said restriction band which is registered in advance in said service provider data base, judges whether or not 'bypass' of said service provider is registered in said service provider data base when said band used by said circuit of said service provider is larger than said restriction band, and stores said 'bypass' in correspondence with said service provider in said menu buffer if the answer is in the affirmative; and
    said service executor refers to said menu buffer when said user terminal selects said service provider, obtains a substitute service provider to which said selected service provider is bypassed and which is registered in advance in said service provider data base in correspondence with said selected service provider, if "bypass" is stored in said menu buffer in correspondence with said selected service provider, and requests said path setter to set a path between said user terminal and said substitute service provider.

4. A navigation apparatus comprising:

traffic obtainer for obtaining traffic of each circuit which accommodates a service provider respectively;

a traffic storage buffer for storing said traffic obtained by said traffic obtainer;

a user information data base for storing access information showing whether or not said user terminal is accessible to each service provider;

a menu optimizer for judging whether or not said user terminal can be connected to each accessible service provider with reference to said traffic of said circuit accommodating said accessible service provider, creating a service selection menu which reflects the possibility of connection for each accessible service provider and displaying said service selection menu on said user terminal;

a menu buffer for storing the result of the judgement by said menu optimizer; and a service executor for monitoring an operation of said user with respect to said service selection menu and executing predetermined control which corresponds to said operation;

wherein said menu optimizer extracts said accessible service provider with reference to said access information stored in said user information data base when said user terminal is connected to said navigation apparatus, obtains available band of the circuit accommodating said accessible service provider with reference to said traffic of said circuit of said accessible service provider stored in said traffic storage buffer, judges whether or not said user terminal can be connected to said accessible service provider in consideration of said available band and band necessary for the offer of the service from said service provider, stores the possibility of connection to each accessible service provider in said menu buffer, creates said service selection menu so as to reflect said possibility of connection to each accessible service provider, and displays said service selection menu on said user terminal; and said service executor judges whether or not said user terminal can be connected to said service provider with reference to said menu buffer when said service provider is selected, and requests a path setter to set a path between said user terminal and said selected service provider if the answer is in the affirmative.

5. A navigation apparatus according to claim 4, wherein said access information is (1) subscription information showing whether or not said user terminal can receive the service from a service provider under contract with said service provider, and (2) access restriction information which is set by said user's own will and which shows whether or not the access to said service provider is restricted.

6. A navigation apparatus according to claim 4, further comprising:

a service provider data base for storing information as to a service provider;

wherein said user information data base stores performance of said user terminal;

said service provider data base stores performance of each service provider; and said menu optimizer means compares said performance of said user terminal with said performance of said service provider when said user terminal is connected to said navigation apparatus so as to judge whether or not said service provider is accessible, and stores the possibility of connection to each service provider in said menu buffer.

7. A navigation apparatus according to claim 4, further comprising:

a reason text table for storing a reason code corresponding to the reason for the impossibility of selection of a service provider and the message conveying said reason in correspondence with each other; wherein said menu optimizer means stores said reason code which corresponds to said reason for the impossibility in said menu buffer when said user terminal cannot be connected to said service provider, creates said service selection menu so as to enable discrimination between the possibility and impossibility of selection of said service provider, and displays said service selection menu on said user terminal; and when said service provider to which said user terminal cannot be connected is selected by said user terminal, said service executor displays said reason for the impossibility of selection on said user terminal with reference to said reason code stored in said menu buffer.

8. A navigation apparatus according to claim 7, further comprising:

a service provider data base for storing information as to said service provider;

wherein said navigation apparatus displays the information of a service provider on said user terminal when said user terminal selects said service provider.

9. A navigation apparatus according to claim 4, wherein said menu optimizer means judges whether or not each of accessible service providers can be connected at each quality level in consideration of said available band of said circuit accommodating each service provider and said band necessary for providing the service at each quality level, stores the result of the judgement in said menu buffer, creates said service selection menu so as to reflect said result of said judgement and displays said service selection menu on said user terminal; and said service executor judges whether or not the service can be provided at a desired quality level with reference to said menu buffer when said user terminal selects a service provider and said quality level, and requests said path setter to set a said path between said user terminal and said selected service provider if the answer is in the affirmative.

10. A navigation apparatus comprising:

a traffic obtainer for obtaining traffic of each circuit which accommodates a service provider respectively;

a traffic storage buffer for storing said traffic obtained by said traffic obtaining means;

a menu optimizer for judging whether or not a user terminal can be connected to said service provider with reference to said traffic of said circuit which accommodates said service provider, creating a service selection menu which enables a user terminal to discriminate the impossibility of connection of said service provider which cannot be connected and to reserve the service of said service provider and displaying said service selection menu on said user terminal;

a service executor for monitoring an operation of said user with respect to said service selection menu and executing predetermined control corresponding to said operation;

a reservation control table for storing information which specifies said service provider reserved by said user terminal;

a reservation register buffer for storing corresponding information on said user terminal which has reserved said service provider and said service provider reserved by said user terminal;

a reservation register for setting said information in said reservation control table and said reservation register buffer respectively; and a reservation executor for executing a path setter control between said user terminal which has reserved said service provider and said service provider reserved by said user terminal; wherein said menu optimizer obtains available band of each circuit accommodating said service provider with reference to said traffic of said circuit when a user terminal is connected to said navigation apparatus, judges whether or not said user terminal can be connected to each service provider on the basis of said available band and band necessary for the offer of the service from said service provider, creates said service selection menu so as to enable said service provider which cannot be connected to said user terminal due to a shortage of available band to be distinguished and the service thereof to be reserved, and displays said service selection menu on said user terminal;

said service executor requests a path setting means to set a path between a user terminal and said service provider when said user terminal selects said service provider which can be connected thereto, and starts said reservation register when the reservation of said service provider which cannot be connected is input; and said reservation register sets said corresponding information on said user terminal which has reserved and said service provider which is reserved in said reservation register buffer, and sets a reservation flag at a position corresponding to said service provider in said reservation control table;

and, after said reservation, said menu optimizer obtains said reserved service provider with reference to said reservation control table, judges whether or not said available band of said reserved service provider is larger than said band necessary for the offer of the service from said service provider, and starts said reservation executor if the answer is in the affirmative; and said reservation executor requests said path setter to set said path between said service provider which is stored in said reservation register buffer and said user terminal which is stored in said reservation register buffer in correspondence with said service provider.

11. A navigation apparatus according to claim 10, wherein said menu optimizer judges whether or not a service provider can be connected at each quality level in consideration of said available band of said circuit accommodating each service provider and said band necessary for providing the service at each quality level, creates said service selection menu so as to enable a quality level and a service provider which cannot be connected to a user terminal at said quality level due to a shortage of available band to be distinguished and the service thereof to be reserved, and displays said service selection menu on said user terminal.

* * * * *